United States Patent [19]
Eto et al.

[11] Patent Number: 5,701,581
[45] Date of Patent: Dec. 23, 1997

[54] METHOD FOR BIDIRECTIONALLY TRANSMITTING DIGITAL VIDEO SIGNAL AND DIGITAL VIDEO SIGNAL BIDIRECTIONAL TRANSMISSION SYSTEM

[75] Inventors: Yoshizumi Eto, Sagamihara; Nobuo Murata, Musashino; Kazuhiro Tanabe, Tachikawa; Hiroyuki Nisikawa, Kamifukuoka, all of Japan

[73] Assignee: Hitachi Denshi Kabushiki Kaisha, Tokyo, Japan

[21] Appl. No.: 361,724

[22] Filed: Dec. 23, 1994

[30] Foreign Application Priority Data

| Dec. 28, 1993 | [JP] | Japan | 5-352868 |
| May 27, 1994 | [JP] | Japan | 6-115243 |
| May 27, 1994 | [JP] | Japan | 6-115244 |
| Sep. 9, 1994 | [JP] | Japan | 6-215466 |

[51] Int. Cl.⁶ .......... H04H 1/00; H04Q 11/04; H04N 7/14; H04N 7/18
[52] U.S. Cl. .......... 455/5.1; 348/12; 348/16; 348/17; 348/143; 348/212; 370/62; 370/66; 370/68; 370/105.1; 370/109
[58] Field of Search .......... 348/15, 16, 17, 348/14, 13, 12, 143, 211, 212, 6; 370/62, 105.1, 109, 68, 66, 58.1, 29; 455/5.1; H04N 7/18, 7/14, 7/15, 7/10, 9/47, 5/232

[56] References Cited

U.S. PATENT DOCUMENTS

| 4,878,242 | 10/1989 | Springer et al. | 379/204 |
| 4,888,795 | 12/1989 | Ando et al. | 348/18 |
| 5,229,850 | 7/1993 | Toyoshima | 358/108 |
| 5,231,492 | 7/1993 | Dangi et al. | 348/15 |
| 5,371,534 | 12/1994 | Dagdeviren et al. | 348/16 |
| 5,392,284 | 2/1995 | Sugiyama | 348/17 |
| 5,396,269 | 3/1995 | Gotoh et al. | 348/14 |
| 5,400,068 | 3/1995 | Ishida et al. | 348/16 |
| 5,402,418 | 3/1995 | Shibata et al. | 370/62 |
| 5,408,261 | 4/1995 | Kamata et al. | 348/17 |
| 5,412,418 | 5/1995 | Nishimura et al. | 348/17 |

FOREIGN PATENT DOCUMENTS

| 0271969 | 6/1988 | European Pat. Off. | H04N 7/18 |
| 9102414 | 2/1991 | WIPO | H04B 1/66 |

OTHER PUBLICATIONS

*Patent Abstracts of Japan*, vol. 11, No. 240 (E-529), Aug. 6, 1987 (for JPA-62-53095, H. Kuroda et al., published Mar. 7, 1987).

J. Kirsten et al., "One coax cable carries video and power", *Electrical Design News*, vol. 36, No. 6, Mar. 14, 1991, pp. 137-138, 140.

*Primary Examiner*—Victor R. Kostak
*Assistant Examiner*—John W. Miller
*Attorney, Agent, or Firm*—Antonelli, Terry, Stout, & Kraus, LLP

[57] ABSTRACT

In a video signal transmission method and system wherein a signal containing a video signal is bidirectionally transmitted and received in a substantially real time in video appliances coupled via a transmission path to each other, a digital signal containing a digital video signal is time-compressed, and a transmission operation is controlled in such a manner that a transmission period and a no transmission period are alternately produced in a preselected period. Then, the time-compressed digital signal is transmitted to the transmission path during the transmission period, whereas another digital signal transmitted via the transmission path from the video appliance on the counter side is received during the no transmission period. Then, the received digital signal is time-expanded to reproduce the original signal.

14 Claims, 16 Drawing Sheets

SYNC SIGNAL
DETECTING PHASE
PULSE P1

NORMAL RECEPTION
JUDGING PULSE P2

TRANSMISSION STOP
INSTRUCTING PULSE P3

METHOD FOR BIDIRECTIONALLY TRANSMITTING DIGITAL VIDEO SIGNAL AND DIGITAL VIDEO SIGNAL BIDIRECTIONAL TRANSMISSION SYSTEM

BACKGROUND OF THE INVENTION

The present invention relates to an apparatus such that two video appliances such as a television camera and a controlling unit thereof (will be referred to a "CCU", i.e., Camera Control Unit) are coupled with each other by employing a single transmission path through which a video signal, an audio signal, and a control signal are multiplexed and transmitted in a bidirectional manner.

Conventionally, in case that for example, a television camera (will be abbreviated as a "camera" hereinafter) is coupled with a CCU, and the video, audio, and control signals are multiplexed and transmitted between them in the bidirectional manner, such a conventional method is well utilized in that the triple coaxial cable called as "TRIAX" is frequency-divisionally multiplexed. In this conventional method, as represented in FIG. 2, three sorts of video (picture) signals R, G, B obtained from the camera 1 and four sorts of audio signals A1, A2, A3, A4 obtained therefrom are transmitted from the camera 1 to the CCU 2. On the other hand, the video signal M for a monitor (not shown), the audio signal A5 for instructing a cameraman (not shown either), and the control signal D for controlling the operation of the camera 1 are transmitted from the CCU 2 to the camera 1.

Also, to bidirectionally transmit a plurality of signals to a single cable 7, these signals occupy the different frequency bands (ranges), as represented in FIG. 3, by amplitude-modulating the carrier waves with the different frequencies. As a result, all components can be separated in the camera 1 and the CCU 2 without any interference from the signals present on the cable 7 at the same time by way of the filter provided on either the camera 1 or the CCU 2.

In FIG. 4, there is shown a schematic structural diagram of the conventional analog transmission system. In this drawing, a signal transmitting/receiving apparatus 143 is connected to a camera 131. Another signal transmitting/receiving apparatus 144 is connected to a CCU 138. These transmitting/receiving apparatuses 143 and 144 are coupled with each other by a transmission cable 135. Reference numerals 139, 140, 141, 142 show gate circuits capable of separating a transmission signal from a reception signal. The video signal, the audio signal, and the control signal, which are obtained from the camera 131, are processed in a frequency division/multiplex processing circuit 132 of transmitting/receiving apparatus 132 in such a manner that carrier waves having different frequencies are amplitude-modulated (AM) to produce signals having different frequency bands (ranges), and then these AM signals are multiplexed. Then, the multiplexed signal is transmitted via a cable 135 to the CCU 138 side. On the CCU side 138, the multiplexed AM signal transmitted from the camera 131 side is separated by a filter employed in a separating circuit 137 in such a way that all of the signal components contained in this multiplexed signal are separated without any mutual interference.

Similarly, the video signal, the audio signal, and the control signal, which are derived from the CCU 138 side, are processed in another frequency division/multiplex processing circuit 136 in such a manner that these signals are modulated to obtain the modulated signals having different frequency bands from those of the AM signals used in the camera side 131, and then these modulated signals are multiplexed. Then, the multiplexed signal is transmitted to the camera 131 side. On the camera side 131, the multiplexed signal transmitted from the CCU 138 side is separated by way of a filter of another separating circuit 133.

As described above, a plurality of signals are transmitted via a single cable 135 in the bidirectional manner. Here, in the television camera system, these apparatuses must be synchronized with each other. For instance, when a plurality of camera systems (a single camera system is constructed by a set of a camera and a CCU) are operated at the same time, video signals produced from a plurality of cameras must be synchronized with each other.

In such a television studio system that a selection is made of any one of plural camera systems and an image outputted from the selected camera system is externally sent out, the frame phases of the image signals derived from a plurality of camera systems must be mutually made coincident in order that when the plural camera systems are switched, the images are not interrupted, or not brought into synchronous states. This treatment implies the camera synchronization.

Conventionally, such a synchronizing operation is known in the art that one sync (synchronization) signal is commonly supplied to all of the CCUs, and the synchronizing operations are carried out in the respective CCUs on the basis of this single sync signal. Similarly, the respective cameras are synchronized with the respective CCUs based on this single sync signal. With employment of such a system, a plurality of camera systems can be synchronized with each other.

Referring now to FIG. 4, the synchronizing operations between the camera 131 and the CCU 138 will be described.

To synchronize the video phase of the camera 131 with the video phase (for instance, frame phase) constituting the operation bases for the respective apparatuses employed in the CCU side 138, conventionally, the video phase signal (for example, frame signal) 9 of the CCU 138 is modulated and multiplexed in a similar manner to the video signal, and then the resultant signal is transmitted to the camera 131. On the camera 131 side, the video phase signal is separated from the multiplexed signal transmitted from the CCU 138 by way of the filter of the separating circuit 133. Then, a reference video phase signal is produced in a reference video phase signal generating circuit 134, so that the camera 131 is operable on the basis of this reference video phase signal. As a result, the video phase of the camera 131 may be synchronized with the video phase of the CCU 138.

With employment of the above-described synchronizing methods, both of the synchronizing process in the video phases between the camera and the CCU, and also the bidirectional signal transmission could be achieved in the conventional transmission systems. However, all of these signal synchronizing processes are carried out in the analog form. That is, since the signals are amplitude-modulated to be transmitted in the above-described multiplex transmission apparatus, the video signal and the audio signal produced from the camera side, or the CCU side are adversely influenced by the cable characteristic or the filter characteristic, resulting in deterioration of the signal characteristics. As a consequence, the conventional multiplex transmission systems owns such a problem that there is a limitation in the signal transmittable distance.

On the other hand, the transceiver with the bidirectional simultaneous transmitting/receiving system is disclosed in PCT patent application No. W091-02414 opened in 1991 in the radio communication field.

SUMMARY OF THE INVENTION

An object of the present invention is to realize a digital video signal bidirectional transmission apparatus capable of solving the problem of the analog bidirectional transmission system, namely deterioration of the signal characteristics.

Another object of the present invention is to provide such a bidirectional signal transmission system that deterioration in signal transmission characteristics can be solved and a circuit scale can be reduced while maintaining video phase synchronizing operations between a camera and a CCU, and also bidirectional signal transmissions.

Furthermore, another object of the present invention is to realize a digital video signal multiplexing transmission system with low cost and high performance, capable of being operated under stable conditions even when this multiplexing transmission system is started up, and the communication is temporarily interrupted due to switching of transmission paths as well as loose connections, and furthermore asynchronous conditions are produced.

A still further object of the present invention is to provide such a transmission apparatus that a bidirectional signal transmission can be performed via such a transmission path with a limited transfer bit rate.

In the video signal transmission method and the transmission system according to the present invention, the signal containing the video signal is transmitted and received in a substantially real time in a bidirectional manner between the video appliances coupled to each other via the transmission path. In the respective video appliances, the digital signal containing the digital video signal is time-axis compressed. Furthermore, the transmission operation is so controlled that the transmission period (first transmission period) and the no transmission period (second transmission period) are alternately produced in a predetermined period, and the time-axis compressed digital signal is transmitted to the transmission path during the transmission period. The digital signal transmitted from the opposite video appliance via the transmission path is received during the no transmission period. The received digital signal is time-axis expanded to reproduce the original signal.

In accordance with an embodiment of the present invention, in the bidirectional signal transmission performed between the two video appliances, the video signal, audio signal, and control signal are converted into the digital signals, and then these digital signals are transmitted via the cable in the digital code form.

Also, these plural signals are time-divisionally multiplexed and time-axis compressed for transmission purposes.

Furthermore, both of the signal period and the no signal period, which are transmitted in the bidirectional manner, are provided, and the time-axis compressed signal from one video appliance is transmitted during the signal period and the time-axis compressed signal from the other video appliance is transmitted during the no signal period.

In another embodiment of the present invention, in the video appliances provided on both ends of the transmission path, the digitally-processed video, audio, and control signals are time-divisionally multiplexed, and then are time-axis compressed. Further, such a transmission signal is produced that the signal period and the no signal period are repeated. When the transmission signal derived from the other end is mutually transmitted in the bidirectional manner during the no signal period of the transmission signal derived from this transmission path, as the transferring period of this bidirectional communication, for instance, the frame period is divided into the integer quantity of time blocks and these subdivided time blocks are utilized. Moreover, such a sync-coded signal indicative of the sync-coded frame period is attached to the transmitting signal derived from one end of the transmission path, and the resultant signal is transmitted, so that the video phases are synchronized with each other at both ends of the transmission path based on the signal representative of this frame period.

In another embodiment of the present invention, in the video appliances provided on both ends of the transmission path, the digitally-processed video, audio, and control signals are time-divisionally multiplexed, and then are time-axis compressed. Further, such a transmitting signal is produced that the signal period and the no signal period are repeated. When the transmitting signal derived from the other end is mutually transmitted in the bidirectional manner during the no signal period of the transmitting signal derived from this transmission path, at one end (for instance, camera side) of the transmission path, the sync code is decoded which has been attached to the transmitting signal transferred from the other end (for example, CCU side) of this transmission path. When it is detected that this sync code (synchronization signal) can be periodically received, the transmission of the signal from one end side is commenced. To the contrary, when this sync code cannot be received for a time longer than a preselected value, it is so controlled that the transmission of this signal is stopped for a predetermined time period.

In another embodiment of the present invention, in the video appliances provided on both ends of the transmission path, the digitally-processed video, audio, and control signals are time-divisionally multiplexed, and then are time-axis compressed. Further, such a transmission signal is produced that the signal period and the no signal period are repeated. When the transmission signal derived from the other end is mutually transmitted in the bidirectional manner during the no signal period of the transmitting signal derived from this transmission path, at least the transmitting signal derived from one end of the transmission path is processed such that such a bit rate reducing process as the band limit and the data compression is carried out. Then, the processed signal is transmitted.

A plurality of digital signals such as the video signal, audio signal and control signal are multiplexed in the time divisional manner, and time-axis compressed, and thereafter these processed signals are mutually transmitted between the video appliances. Accordingly, the signal periods are not overlapped with each other. All of the video, audio, control signals are received between the two video appliances, for example, the camera and CCU sides, without any interference. Thus, the bidirectional signal transmission can be realized with employment of a single channel.

On both of the camera side and the CCU side, the signals are processed by way of the digitalizing process, the time-divisional multiplexing process, the time-axis compressing process. Also, such a transmitting signal that the signal period and the no signal period are repeated is produced. During this signal period, the corresponding transmitting signal is transmitted from the camera side. During the no signal period subsequent to this signal period, the corresponding transmitting signal is transmitted from the CCU side. As described above, since the transmitting signals are alternately transmitted from both of the camera side and the CCU side, there is no such a condition that both of the transmitting signals derived from the camera side and the CCU side appear on the transmission path at the same time.

The respective video, audio, and control signals do not interfere with each other, but can be separated on the camera side and the CCU side to a consequence, the bidirectional signal transmission can be achieved with a single transmission path.

Since such a time unit is employed as the transmission period for this bidirectional signal transmission in that for example, the frame period is subdivided into the integral quantity of time blocks, the frame signal functioning as the video phase information can be readily transmitted. Also, the circuit scale of the video phase synchronizing apparatus can be reduced.

When the system is started up and the transmission path is switched, the communication is temporarily interrupted due to loose connections the synchronizing conditions cannot be maintained, and the respective transmitting signals are present on the same transmission path at the same time, so that the signals cannot be correctly received. In such a worse case, since the sync code added to this transmitting signal cannot be received during a preselected time period (e.g., 1 vertical scanning period), the transmission of the transmitting signal derived from one end side (e.g., camera side) of the transmission path is interrupted for another preselected time period (e.g., 2 vertical scanning periods). As a result, the sync code attached to the transmitting signal derived from the other end (for instance, CCU side) of this transmission path can be received, so that the synchronization can be correctly achieved between the video appliances (for example, camera and CCU) provided on both ends of the transmission path.

Consequently, a plurality of digitalized signals are time-divisionally multiplexed to be transmitted, whereby all of the video, audio, control signals can be separated on the camera side and the CCU side without any interference, and further the bidirectional signal transmission is available under a single cable. Also, the present invention could avoid such a conventional problem that when the power supply is started up and the communication is temporarily interrupted, both of the terminals perform the signal transmission at the same time and therefore the normal signal reception cannot be performed.

Among the signals to be bidirectionally transmitted, such a signal which should be transmitted without any image deterioration is processed by way of such a deterioration-free process as the time-axis compression for transmission purposes. Such a signal which may be transmitted with little image deterioration is processed by way of the band limit process and the data compression process, so that the bit rate of this signal is lowered for transmission purposes. As a consequence, the entire transfer bit rate of the transmission signals can be reduced. It is possible to realize such a transmission apparatus capable of transmitting the signals in the bidirectional manner at the highest efficiency with employment of such a transmission path with the limited transfer bit rate. Also, the frequency bands required in such a bidirectional signal transmission can be narrowed.

DESCRIPTION OF THE PREFERRED EMBODIMENTS

Figure 1:
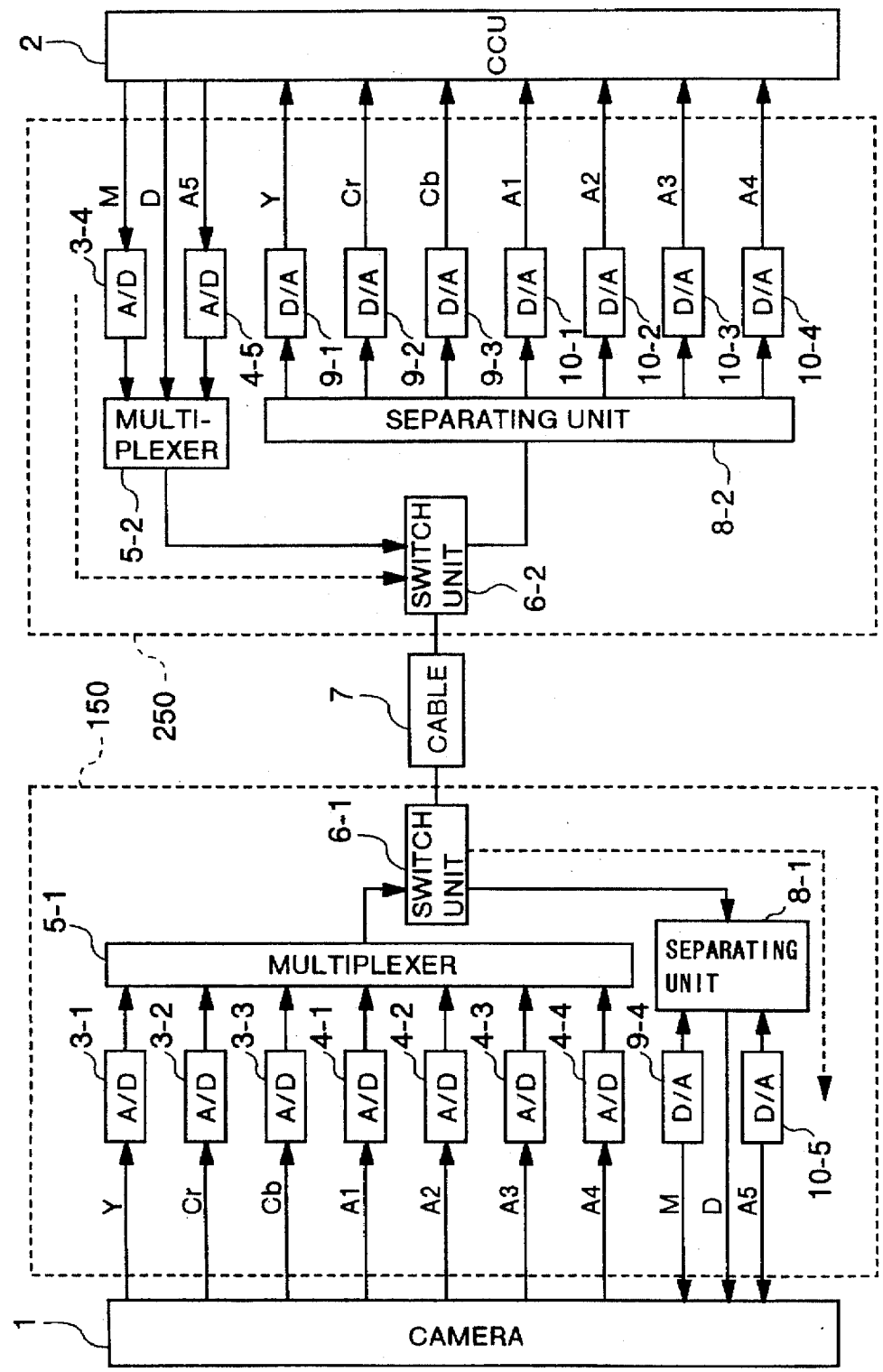
FIG. 1 is a schematic block diagram for representing a video signal bidirectional transmission system according to an embodiment of the present invention.
Figure 2:
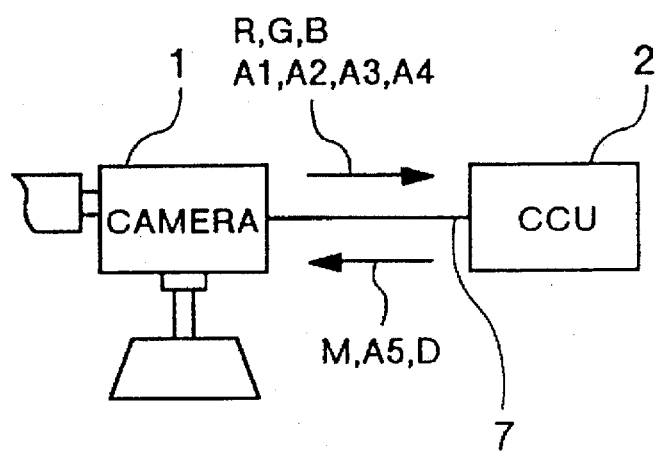
FIG. 2 explanatorily shows a data transmission performed between a camera and a CCU.
Figure 3:
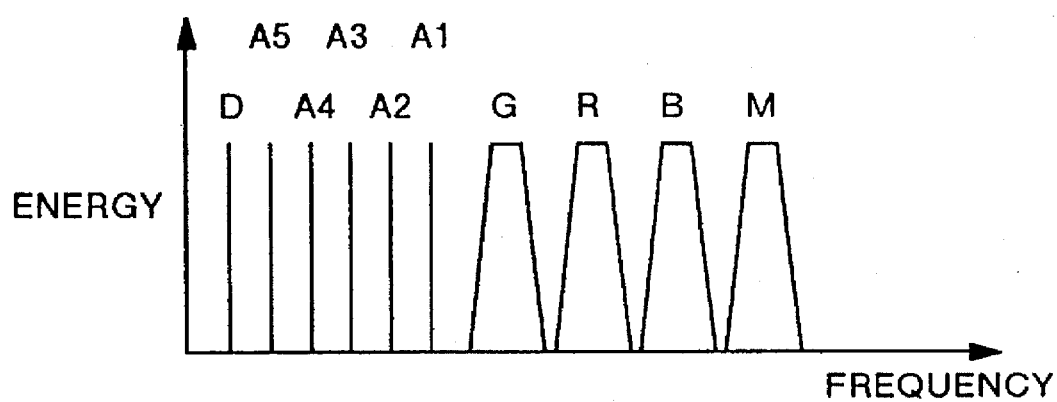
FIG. 3 is a graphic representation of the frequency spectrum of the analog signal transmitted by the conventional frequency multiplexing system.
Figure 4:
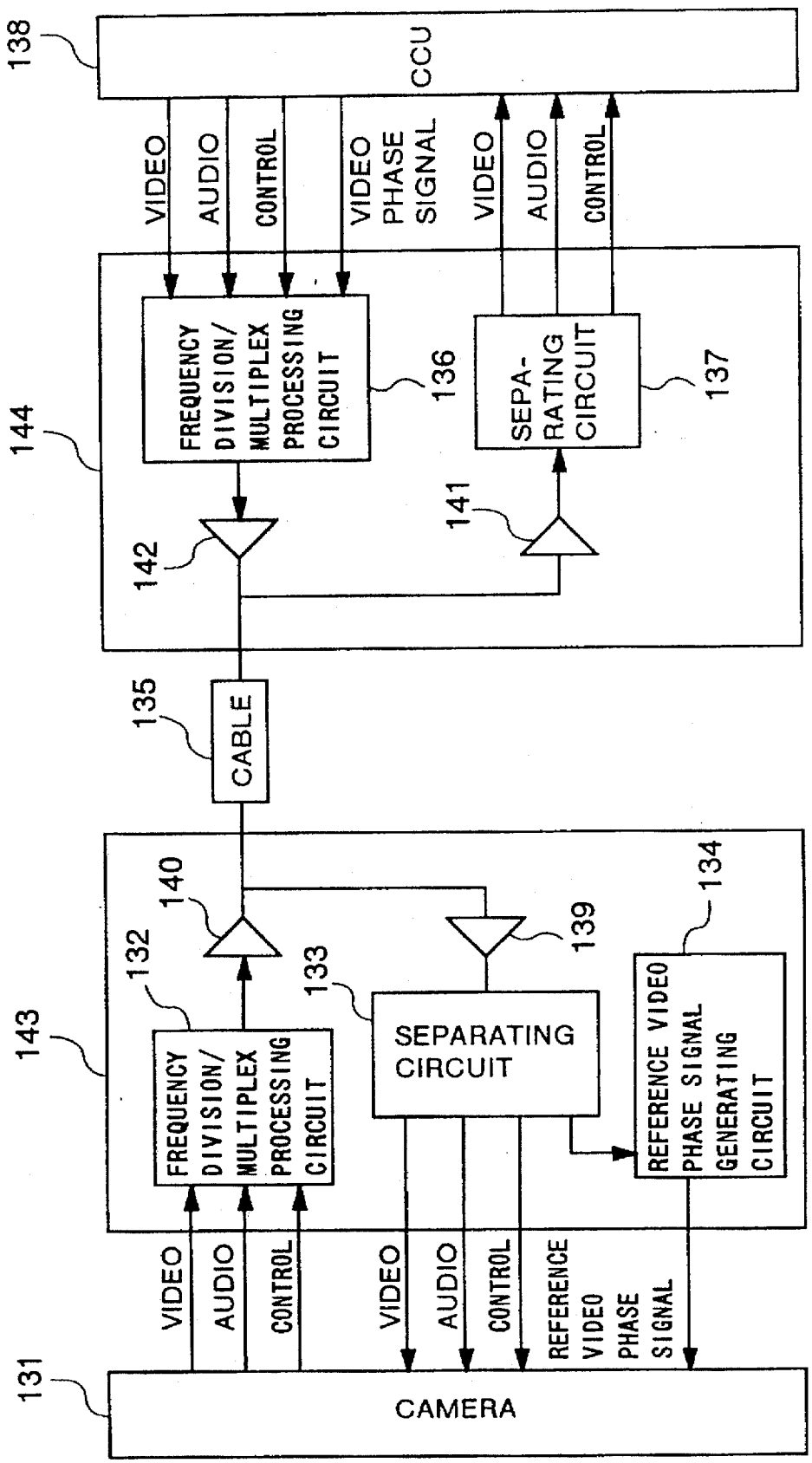
FIG. 4 is a schematic block diagram for indicating the bidirectional transmission system in which the analog signal is transmitted by the conventional frequency multiplexing system.

In FIG. 1, there is shown an arrangement of a video (picture) signal bidirectional transmission system according to an embodiment of the present invention. It is assumed in this embodiment that a video (picture) signal obtained from a television camera 1 is three sorts of video signals, i.e., a luminance signal "Y" and two sorts of color difference signals "Cr" and "Cb" instead of the respective video signals R, G, B. It is also assumed that each of the frequency bands of the color difference signals Cr and Cb is equal to a half of the frequency band of the luminance signal Y. These three sorts of analog video signals are A/D-converted by A/D converters 3-1, 3-2, 3-3 of a transmitting/receiving apparatus 150 into digital video signals.

During this A/D conversion operation, with respect to the sampling frequency (for instance, 13.5 MHz) of the A/D converter 3-1, the sampling frequencies of the A/D converters 3-2 and 3-3 may be selected to be less than ½ of this sampling frequency (for example, 6.75 MHz).

It should be noted that quantizing bit number when one pixel is sampled to be digitally coded, may be selected to be 8 bits, respectively, with regard to the above-described three sorts of video signals, and then a summation (108 Mb/s) of bit rates of the digitally coded color difference signals Cr and Cb may be set to be equal to the bit rate of the digitally coded luminance signal Y.

On the other hand, the video signal M for the camera monitor, produced from the CCU 2, is converted by an A/D converter 3-4 of a transmitting/receiving apparatus 250 into a digitally coded signal. The sampling frequency and the quantizing bit number of the digitally coded signal during this A/D conversion operation may be selected to be equal to those of the luminance signal, and furthermore the bit rate thereof may be selected to be equal to that of the luminance signal Y.

Assuming that the number of scanning lines of the video signal per 1 frame is 525 and the frame frequency is 29.97 Hz in both of the camera 1 and the CCU 2, the sampling operation is carried out at 13.5 MHz, which implies that the sampling number (pixel number) per 1 scanning line is selected to be 858 (=13,500,000÷(525×29.97).

It should also be noted that the audio (sound) signals A1, A2, A3, A4 are converted into digitally coded signals in A/D converters 4-1, 4-2, 4-3 and 4-4. It is assumed that the sampling frequencies and the quantizing bit numbers of these audio signals are selected to be, for instance, 48 kHz and 16 bits, and the bit rate thereof is 768 kb/s. For simplicity, the bit rate of the control signal D is selected to be on the order of 786 kb/s.

In a multiplexing apparatus 5-1 of the transmitting/receiving apparatus 150 provided on the side of the camera 1, the digitally coded luminance signal Y, color difference signals Cr, Cb, and audio signals A1, A2, A3, A4 are multiplexed in the time divisional manner. In another multiplexing apparatus 5-2 of the transmitting/receiving apparatus 250 provided on the side of the CCU 2, the digitally coded video signal M, audio signal A5, and control signal D are multiplexed in the time divisional manner. These multiplexed signals are transmitted via switch units 6-1 and 6-2 to a cable 7.

On the other hand, in the transmitting/receiving apparatus 250 employed on the side of the CCU 2, the signal received from the cable 7 is entered via another switch 6-2 to a separating apparatus 8-2, so that this signal is separated into the luminance signal Y, the color difference signals Cr, Cb, and the audio signals A1, A2, A3, A4. In the transmitting/receiving apparatus 150 provided on the side of the camera 1, the signal received from the cable 7 is entered via a switch unit 6-1 into a separating apparatus 8-1, so that this signal is separated into the video signal M, audio signal A5, and control signal D.

Figure 5:
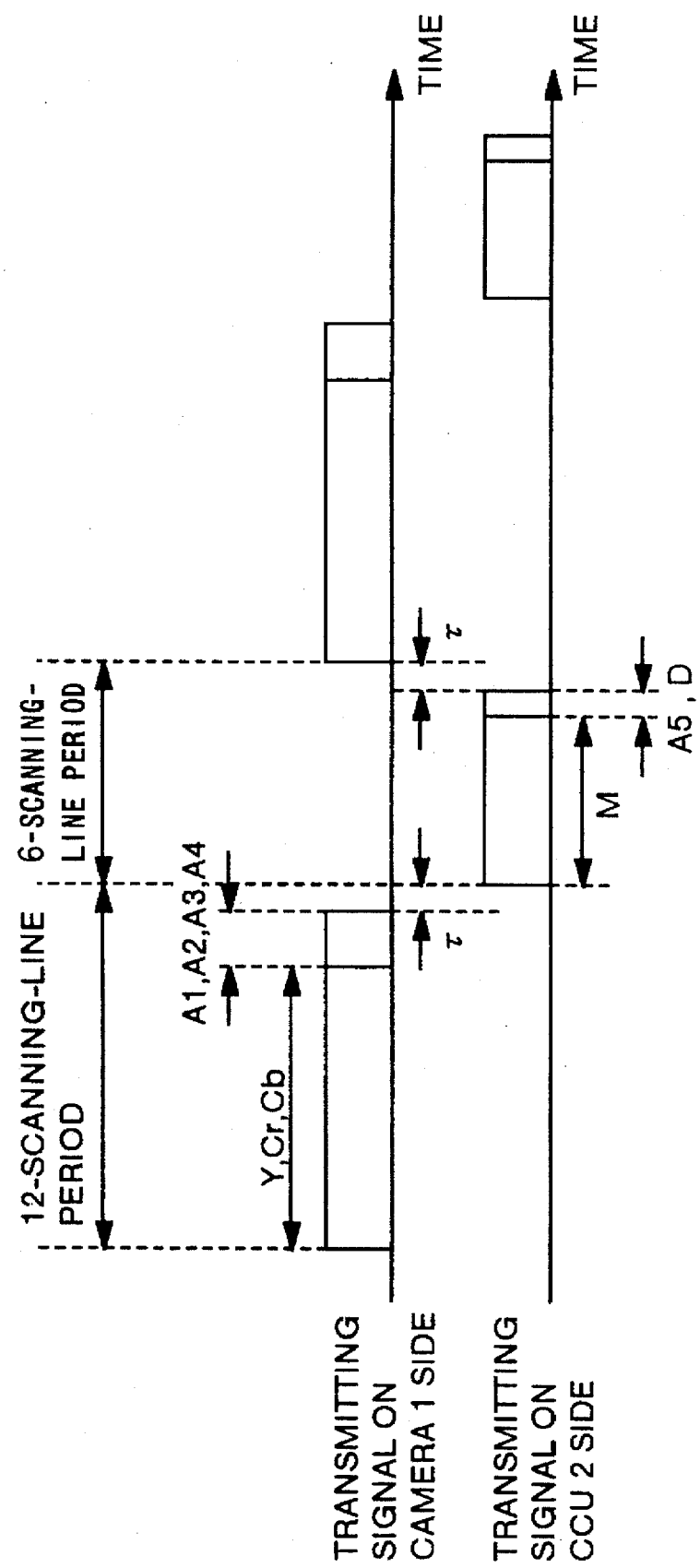
FIG. 5 is a time chart for explaining operations of the bidirectional signal transmission performed in accordance with the embodiment of the present invention.

Now, after a preselected amount of video signal and the like has been transmitted from the camera 1 side by the switch unit 6-1, the signal transmission by this switch unit 6-1 is once interrupted. During this interrupt period, after a preselected amount of video signal and the like has been transmitted by the switch unit 6-2, the signal transmission by this switch unit 6-2 from the CCU 2 side is interrupted. During this interrupt period, the subsequent video signal and the like are transmitted from the transmitting/receiving apparatus 150 on the side of the camera 1. As shown in FIG. 5, the video signal and the like are alternately transmitted from both of the transmitting/receiving apparatus 150 on the side of the camera 1, and the transmitting/receiving apparatus 250 on the side of the CCU 2 in such a manner that both the signal derived from the camera 1 side and the signal derived from the CCU 2 side are not present at the same time on the cable 7.

In general, bit rates of an audio signal and a control signal are considerably lower than that of a video signal. Also, an information amount of the video signal transmitted from the camera 1 to the CCU 2 is larger than that transmitted from the CCU 2 to the camera 1. As a result, all of the bit rates of the signals transmitted from the camera 1 to the CCU 2 may be twice as those of the signals transmitted from the CCU 2 to the camera 1. Thus, a ratio of the time duration for transmitting the signals from the camera 1 side to the time duration for transmitting the signals from the CCU 2 side is selected to be 2:1. In FIG. 5, there is shown such a signal corresponding to 12 scanning line periods are transmitted from the camera 1 side, the signals corresponding to 6 scanning line periods are transmitted from the CCU 2 side.

It is also assumed that both the audio signal and the control signal are multiplexed in the time divisional manner at the tail portion of the video signal.

To perform this time divisional multiplexing operation, it is required that the signals corresponding to 18 scanning line periods are time-axis compressed in the multiplexing apparatus 5-1 of the camera 1 side in such a manner that these signals become such signals corresponding to 12 scanning line periods, and furthermore the signals corresponding to the 18 scanning line periods are time-axis compressed in the multiplexing apparatus 5-2 of the CCU 2 side in such a manner that these signals become such signals corresponding to 6 scanning line periods.

To realize such a signal transmission, the signal bit rate in the cable transmission may be selected to be equal to a summation of the bit rates about all of the signals which are transmitted from both the camera 1 side and the CCU 2 side, or to be higher than this summation.

In case that the signal transmission from the CCU side 2 is commenced at a time instant when the signal transmission from the camera 1 side is stopped, since there is transfer delay time ("τ") caused by the signal transferred from the camera 1 via the cable 7 to the CCU 2 side, both of the transmission signal derived from the CCU 2 side and the transmission signal derived from the camera 1 side are simultaneously present only for this delay time "τ", which cannot be separated by the switch unit 6-2. Since the length of the cable 7 can be known in advance, this transfer delay time "τ" may be determined. As a result, after the signal transmission from the camera 1 side is stopped and only time equal to this delay time "τ" has passed, the signal transmission from the CCU 2 side may be commenced. Similarly, after the signal transmission from the CCU 2 side is stopped and only time equal to this delay time "τ" has passed, the signal transmission from the camera 1 side is commenced.

For instance, assuming now that the length of the cable 7 is selected to be 1 km, the delay time "τ" becomes approximately 5 microseconds. Considering this delay time, the signal bit rate for the cable transmission is insufficient when this bit rate is selected to be equal to the summation of all signal bit rates transmitted from the camera 1 side and the CCU 2 side. That is, this signal bit rate for the cable transmission must be higher than this summation plus this delay time τ.

It should be understood from the explanation of FIG. 5 that the video signals of the camera 1 and the CCU 2 are operated in synchronism with each other, and are switched at the same time instant in unit of scanning line and frame (or field).

On the other hand, there are some possibilities that the switching timings are controlled in the switch units 6-1 and 6-2 on the basis of synchronization between the camera 1 and the CCU 2, and either the camera 1, or the CCU 2 is not switched at the same time.

Figure 6:
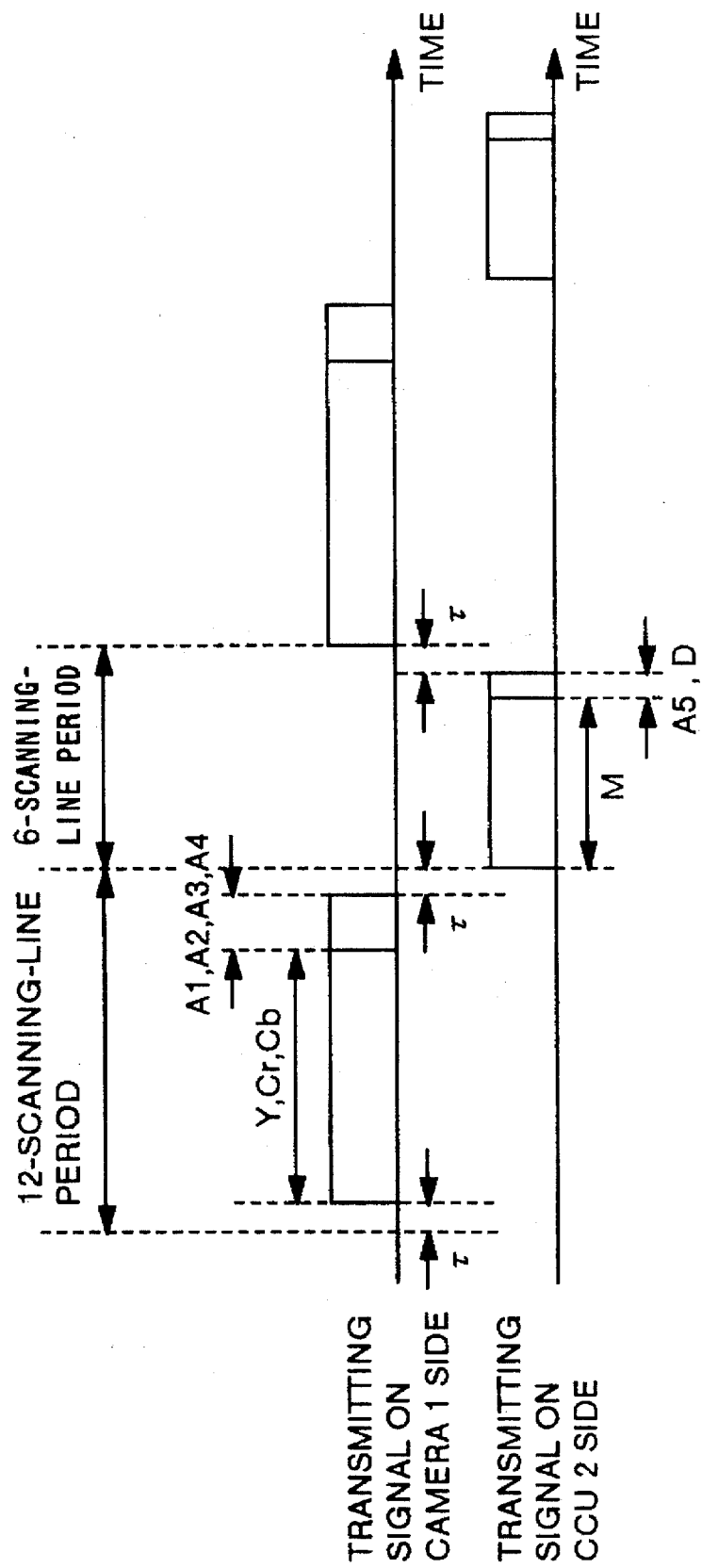
FIG. 6 is a time chart for explaining operations of the bidirectional signal transmission performed in accordance with the other embodiment of the present invention.

As shown in FIG. 6, for instance, such a case will be considered that the time period of the signals (containing sync signal) transmitted from the CCU 2 side correspond to 6 scanning lines, these signals are received by the transmitting/receiving apparatus 150, and based upon this synchronization, the signal is transmitted from the transmitting/receiving apparatus 150 from the camera 1 side. Since the signal transmission period shown in FIG. 6 from the CCU 2 side is longer than the signal transmission period shown in FIG. 5 from the CCU 2 side by the time τ, the starting time of the transmission signal on the camera 1 side will be delayed by the time τ from the start timing corresponding to the 12 scanning lines as illustrated in FIG. 5. In order that the end portion of the signal transmitted from the camera 1 side is not overlapped with the starting portion of the signal transmitted from the CCU 2 side when it is received in the CCU 2 side, the ending time of the signal transmission by the camera 1 side is set to be earlier than the starting time for the start timing of the 6 scanning line periods by the time τ. As a consequence, the time duration of the signal transmitted from the camera 1 side is made shorter than the 12 scanning line periods by the time "2τ", similar to FIG. 5.

Accordingly, in the embodiment of FIG. 6, there is a shift of the time "τ" in unit of scanning line between the transmission signal on the CCU side 2 and the transmission signal on the camera 1 side, so that it is not required to have such a switching control for the scanning line, or the frame (field) at the same time instant between the camera 1 side and the CCU 2 side. Since the width of the transmission signal on the CCU 2 side is a time period corresponding to 6 scanning lines, and is longer than that of the embodiment of FIG. 5 by the time τ, the codes can be sufficiently allocated to the transmission signal on the CCU 2 side, and then it is useful to reduce the compression ratio of the video signal contained in the transmission signal on the CCU 2 side. Accordingly, the image quality can be improved. Further, the sync control bits are increased so that precision for establishing the synchronization can be increased.

It should be noted that the difference between the end time of one transmission signal and the start time of the other transmission signal becomes "τ" at both ends (camera 1 side and CCU 2 side) of the cable 7 in both of FIGS. 5 and 6.

With the above-described treatment, since there are no two signals at the same time on the cable 7, the switch unit 6-2 in the transmitting/receiving apparatus 250 of the CCU 2 limits the supply of signal from the multiplexing apparatus 5-2 and picks up only the signal transmitted from the multiplexing apparatus 5-1 of the transmitting/receiving apparatus 150 of the camera 1 side, and then the separating apparatus 8-2 may separate this picked signal into the video signal, the audio signal, and the control signal. Similarly, on the side of the camera 1, the switch unit 6-1 limits the supply of the signal from the multiplexing apparatus 5-1 and picks up only the signal transmitted from the multiplexing apparatus 5-2 of the transmitting/receiving apparatus 250 employed in the CCU 2 side. Then, the separating apparatus 8-1 may separate the picked signal into the video signal, the audio signal, and the control signal. These separated digital signals are returned to the original analog video signal and the original analog audio signal by way of the corresponding video signal D/A converters 9-1, 9-2, 9-3, 9-4 and the corresponding audio signal D/A converters 10-1, 10-2, 10-3, 10-4 in the camera 1 side and the CCU 2 side, respectively.

Next, a description will now be made of such a case that the transfer bit rate of the cable is selected to be 280 Mb/s as one example. For example, this bit rate corresponds to such a bit rate that the pixel quantity per single scanning line is 1780, and the quantization is carried out by 10 bits/1 pixel. In other words, 280 Mb/s=1780 pixels/scanning line×525 scanning lines/frame×29.97 frames/s×10 bits/pixel. In this embodiment, a calculation about the transfer bit number may be made at higher efficiencies with employment of this value (will be discussed later).

A video signal is constructed of a video period essentially corresponding to a video (picture), and a flyback period not corresponding to this video. Since the signal appearing in the flyback period can be produced and combined at the receiving side, this signal is not always transmitted. Therefore, only such a signal of such pixels corresponding to the video period, for example, 720 pixels is transmitted. As a consequence, the bit number as to the signal appearing during the video period equal to 18 scanning lines becomes 720×(1+½×2)×18×8=207360 bits, namely which is obtained when the three video signals contained in the luminance signal Y and two sorts of color difference signals Cr and Cb which are sampled at a frequency equal to ½ sampling frequency of the luminance signal Y, are quantized by 8 bits/pixel at each.

On the other hand, the bit number of the data transmittable at the data rate of 280 Mb/s during the time period corresponding to 12 scanning lines is equal to 1780×12×10= 213600 bits. Furthermore, assuming now that the cable transfer delay time τ=5 microseconds, the required bit number becomes 1400 (=280 Mb/s×5 microseconds) bits. Taking account of the signal flows shown in FIG. 5, the remaining 4840 (=213600−207360−1400) bits may be used to transfer the audio data. This may correspond to the bit rate of 4.23 Mb/s (=4840 bits×525 scanning lines/frame/18 scanning lines×29.97 frame/s), which can be sufficiently larger than the bit rate of 3 Mb/s (=768 b/s×4 ch) required for 4 channels of audio data.

Also, the signal derived from the CCU 2 during a time period corresponding to 18 scanning lines corresponds to 103680 bits=720 pixels/scanning line×1×18 scanning lines×8 bits. As previously shown, the bit number of the data transmittable during such a time corresponding to 6 scanning lines at the data rate of 280 Mb/s may correspond to the bit number at which the video signal quantized by 10 bits/single pixel can be transmitted, namely 106800 bits= 1780 pixels×scanning line×6 scanning lines×10 bits/pixel. Assuming now that the signal flow of FIG. 5 is similar to the above-described signal flow, the bit number required for the delay time τ=5 micrometers, namely 1400 bits is subtracted, and then the remaining 1720 (=106800−103680−1400) bits may be used so as to transfer the audio signal and the like. When this is averaged, the resultant value corresponds to the rate of 1.50 Mb/s (=1720 bits×525 scanning lines/frame/18 scanning lines×29.97 frames/s), so that the data of 735 kHz other than the audio 1 channel data (768 kHz) can be transmitted.

Figure 7:
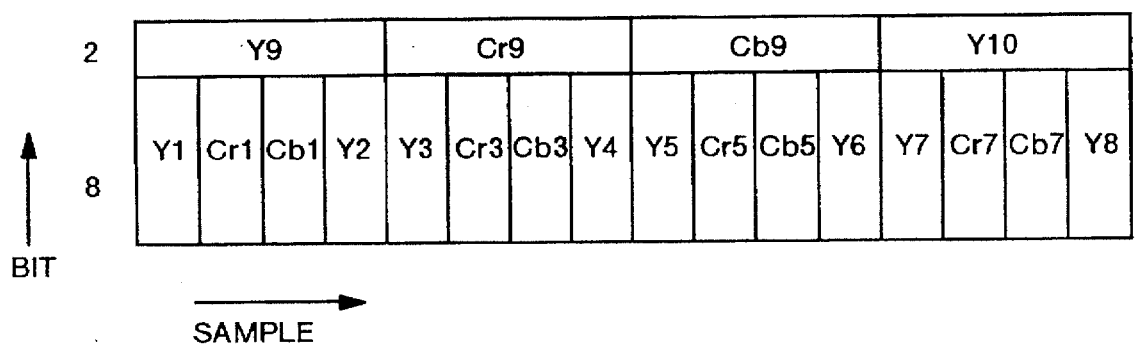
FIG. 7 is an explanatory diagram for explaining an example of bit conversion for a digital signal performed in the embodiment of the present invention.
Figure 8:
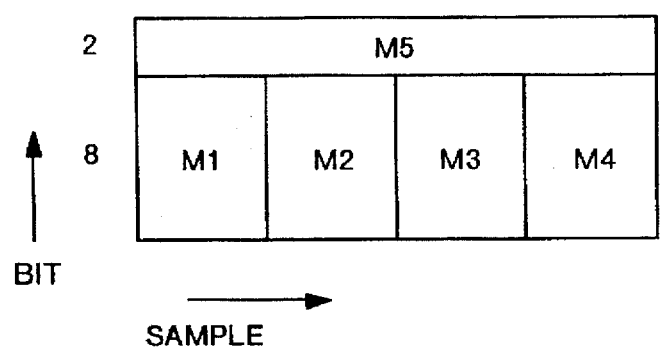
FIG. 8 is an explanatory diagram for showing another example of the bit conversion of the digital signal performed in the embodiment of the present invention.

In this embodiment, both of the luminance signal Y and the video signals of two sets of color difference signal Cr and Cb which are sampled at a frequency equal to ½ sampling frequency are quantized by 8 bits/pixel at each, and then the quantized data are transmitted in unit of 10 bits. The luminance signal Y, and the two sorts of color difference signals Cr and Cb are produced from the camera 1 in the following time sequence of Y1, Cr1, Cb1, Y2, Y3, Cr3, Cb3, Y4, Y5, Cr5, Cb5, Y6, Y7, Cr7, Cb7, Y8, —(since frequency of color difference signals Cr, Cb is equal to ½ sampling frequency, as compared with luminance signal Y, sampling number per unit time also becomes a half, so that reference numerals are selected to be only odd numbers). The bit units of these signal data are converted into 8-bit unit to 10-bit unit as 10 pixels (luminance signal=10 samples and color difference signal=10 samples) are employed as a period, as shown in FIG. 7, for example. Similarly, as indicated in FIG. 8, the video signals M obtained from the CCU 2 in the time sequence of M1, M2, M3, M4, M5, —, are bit-converted into 8-bit unit to 10-bit unit while five pixels are defined as a period.

As a cable used to transmit data, there are coaxial cables, optical cables and the like, by which various signals from DC signals to high frequency signals can be transmitted. On the other hand, there is such a case that power other than the signals is desired to be transmitted through a single cable. In this case, the following description is made of use of a coaxial cable capable of easily transmitting power. For instance, the power is transmitted from the CCU 2 side to the camera 1 side in the form of DC or low-frequency (for example, 50 to 60 Hz) signals. In this case, in order to avoid superimposition between a signal and the power, neither DC signal nor low frequency signal can be transmitted. In other words, the received signal is separated into the power component present in the low frequency component of this received signal and also the signal component present in the high frequency component thereof within the switch unit 6-1, and thereafter, the video signal, audio signal, and control signal are separated from the high frequency component.

Figure 9A:
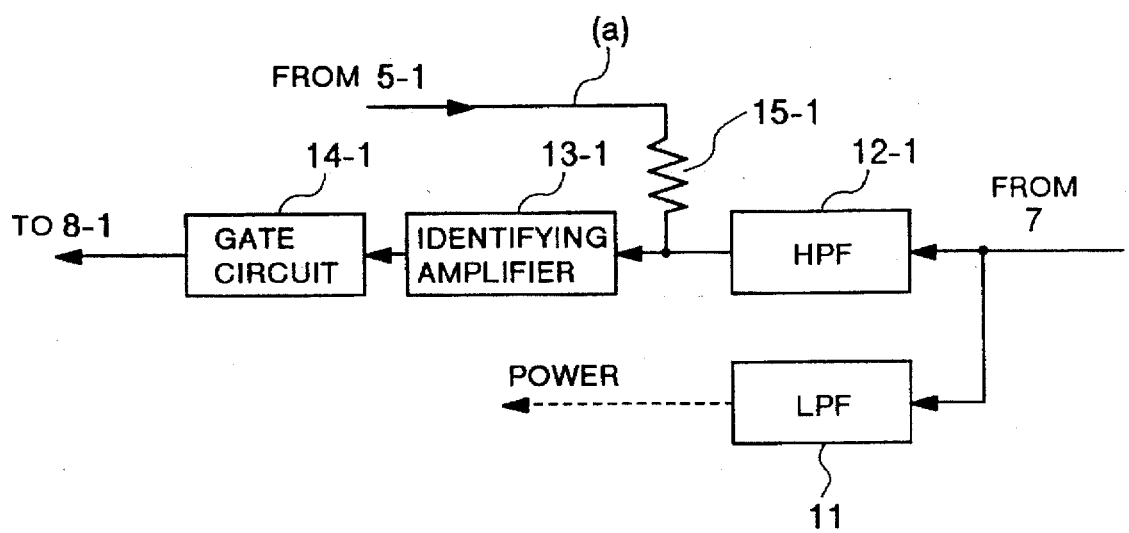
FIG. 9A is a schematic block diagram for showing an example of a concrete structure of a switch unit employed on the camera side within the video signal bidirectional transmission system of the embodiment of the present invention.
Figure 9B:
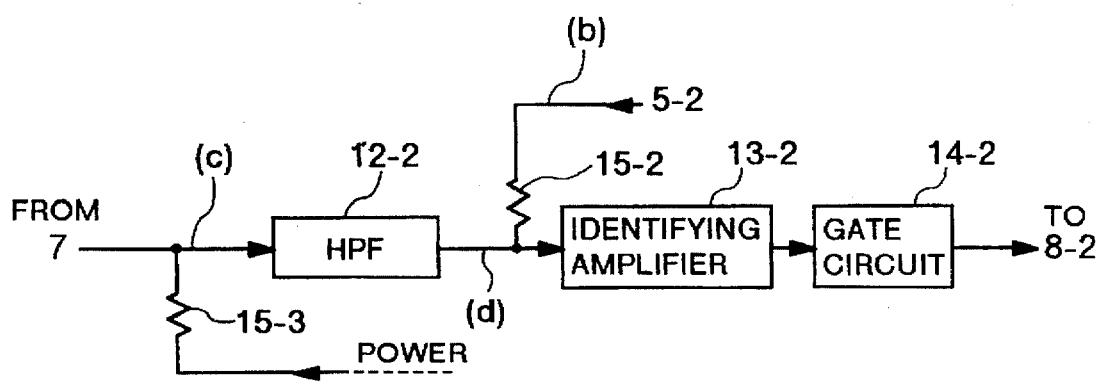
FIG. 9B is a schematic block diagram for indicating an example of a concrete structure of a switch unit employed on the CCU side within the video signal bidirectional transmission system of the embodiment of the present invention.

To this end, a concrete structural example of this switch unit 6-1 is shown in FIG. 9A. From the signal received by the cable 7, the power component is separated by a low-pass frequency filter 11, and the video signal, audio signal, control signal components are separated by a high-pass frequency filter 12-1. Thereafter, the signal which has been filtered by the high-pass filter 12-1 is amplified by an identifying amplifier 13-1 so as to compensate for the attenuated signal component in the cable transmission, and further identified as digital codes 1 and 0. In addition, the transmission signal from the multiplexing apparatus 5-1 in the camera side 1 is removed by a gate circuit 14-1, and then only the reception signal from the CCU 2 is supplied to a separating apparatus 8-1. Similarly, another concrete structural example of the switch unit 6-2 is shown in FIG. 9B.

In this case, distortions may readily occur in the video signal, audio signal, and control signal by removing the low frequency components. Normally, the scramble process is employed in such a way that the occurrence probability of data "1" and "0" is made equal with each other and the DC components are suppressed with respect to the video signal, audio signal, and control signal. In the circuit arrangement of FIG. 1, this scramble process is carried out in, for instance, the multiplexing apparatuses 5-1 and 5-2, whereas the descramble process is performed in the separating apparatuses 8-1 and 8-2.

Figure 10A:
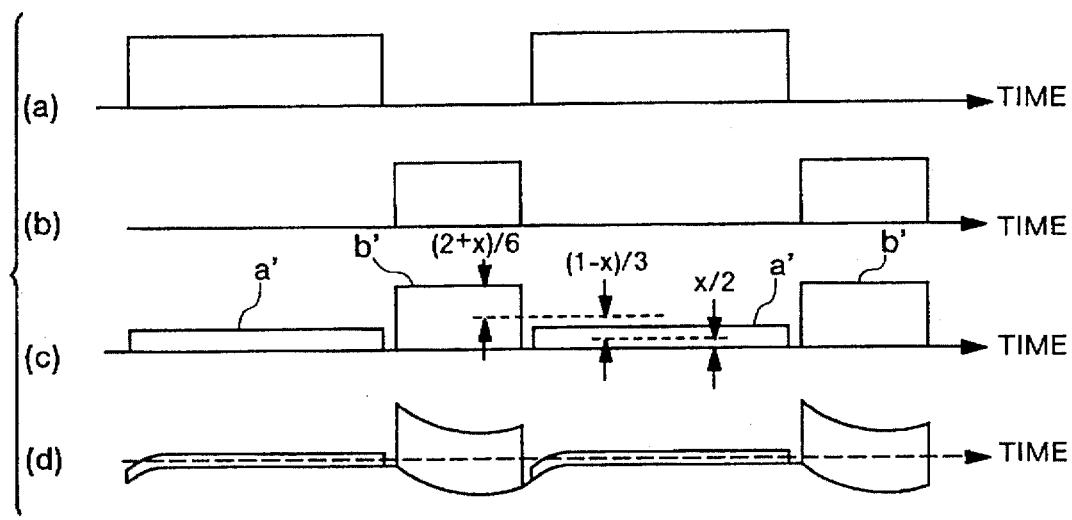
FIG. 10A shows a waveform diagram for explaining operations of the switch unit employed in the transmission system according to the embodiment of the present invention.

In this case, the DC levels of the video signal, audio signal and control signal are fixed to such an average level between the high level of these signals and the low level thereof. As illustrated in FIG. 10A, it is assumed that such a time duration where there is neither the transmission signal (a) from the camera 1 side, nor the transmission signal (b) from the CCU 2 is set to a code "0", since the signal (c) appearing at the input terminal of the switch unit 6-2 of the CCU 2 is made of the high level (b') and the low level (a') attenuated in the cable, the DC level of the signal (d) whose low frequency component has been removed by the high-pass filter 12-2 of the switch unit 6-2 is greatly changed at the starting points of the time periods for the signals from the camera 1 and the CCU 2. When the signal (d) is identified by this identifying amplifier 13-2 with the code "1" and the code "0", there are certain possibilities that data identifying errors about the video signal, audio signal and control signal happen to occur near this starting point. This data identifying error may be similarly produced in the switch unit 6-1 provided on the camera 1 side.

Figure 10B:
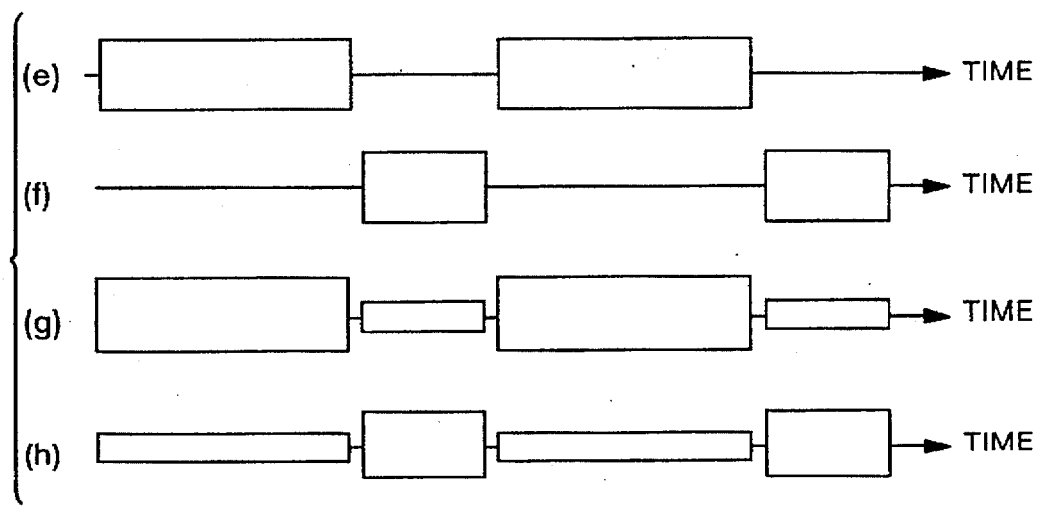
FIG. 10B shows a waveform diagram for explaining operations of the switch unit employed in the transmission system according to the embodiment of the present invention.

To solve this problem, a description will now be made of such an example that the level of the no signal period is selected to a half level defined between the high level and the low level by using the transmission signal (e) from the camera 1, and the transmission signal (f) from the CCU 2 of FIG. 10B. In this case, since no DC change is made in the boundary between the signal period and the no signal period in a signal (h) appearing at the cable end on the CCU side, even when the low frequency component is removed, there is no change in a signal shape (h) thereof. Then, when the identification is made between the reception signal of "1" and the reception signal of "0" on the basis of the averaged level of this signal (h) of the transmitted signal from camera 1 side, there is no erroneous data identification in these video signal, audio signal and control signal.

Figure 9C:
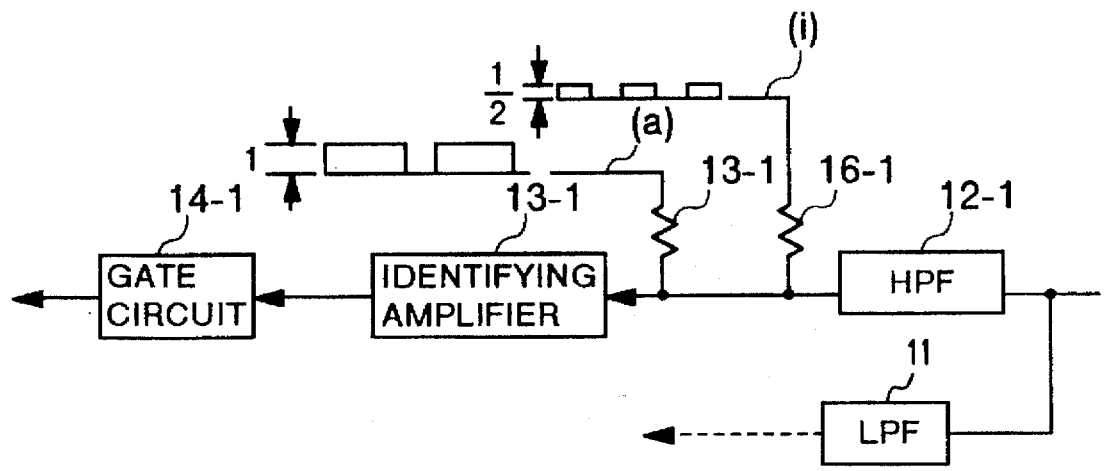
FIG. 9C is a schematic block diagram for showing another example of a concrete structure of a switch unit employed on the camera side within the video signal bidirectional transmission system of the embodiment of the present invention.

In FIG. 9C, there is represented such an embodiment of the switch unit 6-1 employed on the camera 1 side that the level for the no signal period is selected to be a half level (averaged value) between the high level and the low level. In FIG. 9C, a resistor 16-1 is newly added to the circuit arrangement of FIG. 9A, and a DC signal (i) is added through this resistor 16-1. The level of the DC signal (i) is equal to a half of the high level of the signal (a) during time period when there is no signal (a) in the register 15-1, and equal to zero during the other periods. As a result of adding of DC signal (i), signal (a) is changed to signal (e) transmitted from camera 1 side, and a signal (see (g) in FIG. 10B) combined with the received signal from CCU 2 side is entered into the identifying amplifier 13-1. The DC signal (i) can be generated by a circuit (not shown) which outputs a half level of signal (a) in synchronism with the no signal period.

Figure 9D:
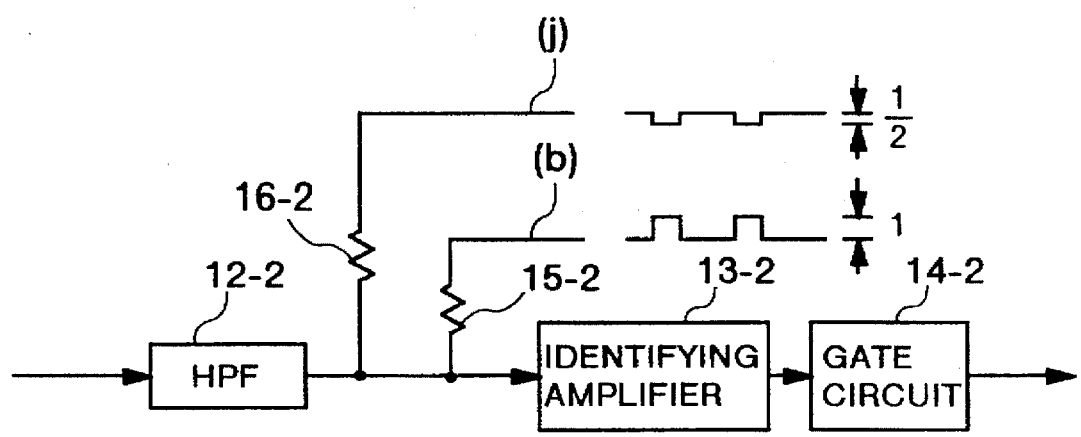
FIG. 9D is a schematic block diagram for indicating another example of a concrete structure of a switch unit employed on the CCU side within the video signal bidirectional transmission system of the embodiment of the present invention.

Similarly, FIG. 9D represents such an embodiment of the switch unit 6-2 employed in the transmitting/receiving apparatus 250 on the CCU 2 side. In FIG. 9D, a resistor 16-2 is newly added to the circuit arrangement of FIG. 9B, and a DC signal "j" is added through this circuit arrangement that the DC voltage signal having the ½ level is outputted in synchronism with the no signal period for the signal (b). The level of the DC signal (j) is equal to a half of the high level of the signal (b) during time period when there is no signal (b) in the register 15-2, and equal to zero during the other periods. As a result of adding of DC signal (j), signal (b) is changed to signal (f) transmitted from CCU 2 side, and a signal (see (h) in FIG. 10B) combined with the received signal from camera 1 side is entered into the identifying amplifier 13-2. The DC signal (j) can be generated by a circuit (not shown) which outputs a half level of signal (b) in synchronism with the no signal period.

When DC is transmitted as power, the high-pass filter 12-1 may be realized by employing only a capacitor. Then, when a time constant between this capacitor and either the input resistance of the identifying amplifier 13-1, or the output resistance (resistor 15) of the separating apparatus 8-1 is selected to be large, the above-described distortion can be considerably reduced, so that it can be obtain such a signal having a shape substantially equal to the signal (c) shown in FIG. 10A. Assuming now that attenuation caused by the signal transmission is selected to be x (note: x<1), an averaged value of the signal (c) constructed of the scrambled signal on the transmission side is given as follows:

$$\tfrac{1}{2}x\cdot\tfrac{2}{3}+x\cdot x\cdot\tfrac{1}{2}x\cdot\tfrac{1}{3}=\tfrac{1}{6}x(2+x).$$

On the other hand, since the averaged value of the received signals during the receiving period of the signal (c) is x/2, the reception signal of "1" can be discriminated from the reception signal of "0", while such a level (see level indicated in (c) of FIG. 10A) is used as the reference, which is smaller than the average value of the input signals into the separating apparatus 8-1 by the below-mentioned value:

$$\tfrac{1}{6}x(2+x)-x/2=(1-x)/3.$$

In this embodiment, the wire transmission using the coaxial cable has been described as the transmission path. However, the present invention is not limited to this wire transmission, but may be equally applied to such a wireless video/audio/data multiplex transmission by FPU and the like (Field Pick-up Unit).

Figure 11:
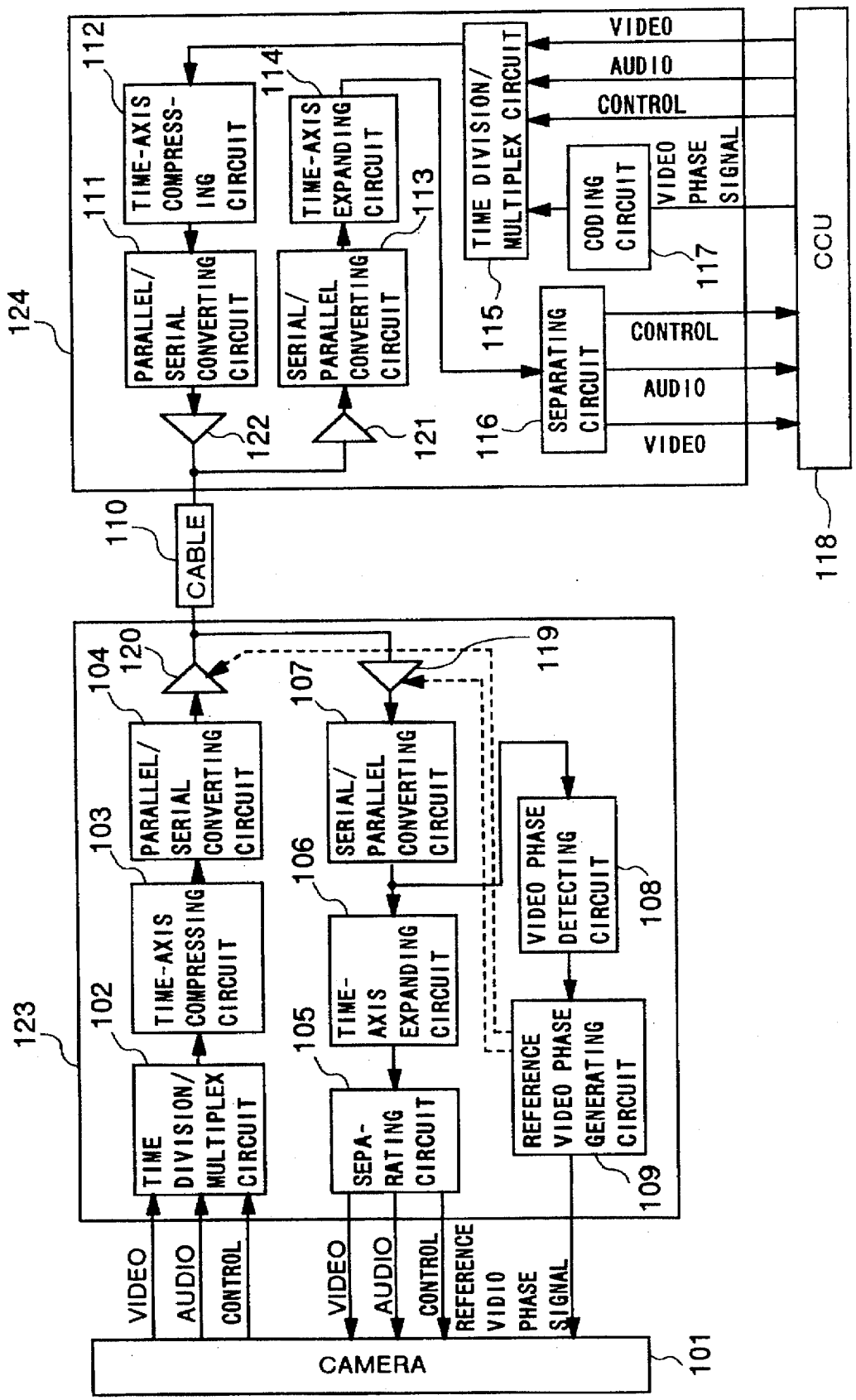
FIG. 11 is a schematic block diagram for showing a video signal bidirectional transmission system according to another embodiment of the present invention.
Figure 12:
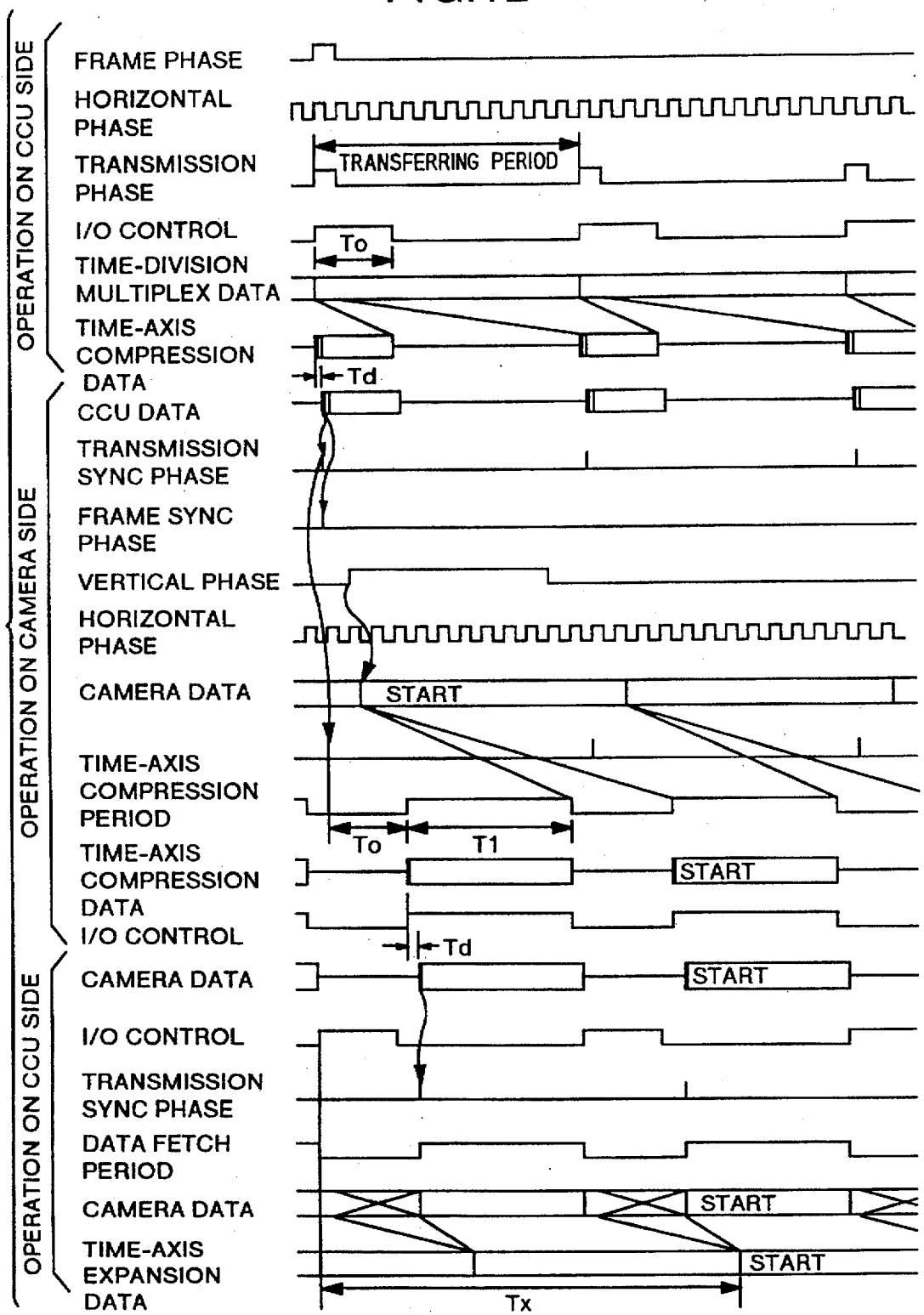
FIG. 12 shows a waveform chart for explaining operations of the video signal bidirectional transmission system indicated in FIG. 11.

In FIG. 11, there is shown an arrangement of another video signal bidirectional transmission system according to another embodiment of the present invention. In FIG. 12, there is indicated such a time chart for showing signal transmission conditions of this bidirectional transmission system. Referring now to FIG. 11 and FIG. 12, operations of this bidirectional transmission system will be described. Here, a reference video phase signal (for example, frame signal) produced in a CCU 118 is used as the operation timing basis for the overall system.

Also, a transmitting/receiving apparatus 124 employed in this CCU 118 owns the camera control function and furthermore a function for converting video and audio signals into digital codes, and also a function for reducing the information amount of the video signal to optimize this video signal with respect to the transmission format. However, since these functional portions of this transmission system are basically identical to those of FIG. 1, no detailed descriptions thereof are made in the specification.

From the CCU 118, a video phase signal (frame signal) functioning as the video phase reference is outputted in addition to the digitally processed video signal, audio signal and control signal. These signals are multiplexed in a time-divisional multiplexing circuit 115, and must have such formats separatable in the camera 101 side. As a method capable of realizing such separatable format, it is conceivable to employ the discrimination by the sync code normally used in the interface rule of the digital video appliances. That is, in order to discriminate this sync code from the transmission data (namely, video signal, audio signal, and control signal), there is a limitation in coding of the transmission data. For instance, if the transmission data is transmitted in unit of 10 bits, and the range of this data is limited to (001) hex to (3 FF) hex, then either (000) hex or (3FF) hex may be used as the sync code. As a consequence, when the sync code is constructed of 4 words, for example, (3FF) hex• (000) hex•(000) hex•(XYZ) hex, the multiplexed transmission data can be discriminated based on fourth code word (XYZ) hex. In other words, if such a continuous word pattern of (3FF)•(1000)•(1000) is detected, then it can be discriminated that this word pattern is the sync code, and then the sort of multiplexed transmission data can be identified based on the information about the subsequent word (XYZ) hex.

Consequently, when the video signal, audio signal, and control signal are multiplexed, if the above-described specific sync code is inserted into these signals, then these signals can be simply separated from the sync code. Also if the video phase signal (frame signal) is converted into a similar sync code and this similar sync code is inserted into a preselected portion of transmission data to be multiplexed, then these signals may be simply separated from this similar sync code.

In a coding circuit 117 shown in FIG. 11, this video phase signal is converted into the specific sync code. It should be understood that as the video phase information, such information about the phase of the vertical scanning period signal and as to whether the phase corresponds to "ODD" or "EVEN" for the horizontal scanning period signal may be simply transmitted. In "ODD" case, the phase of the vertical scanning period signal is coincident with that of the horizontal scanning period, whereas in "EVEN" case, the phase of the vertical scanning period signal is coincident with the center of the horizontal scanning period. Concretely speaking, as this video phase information, there are conceivable the field period (vertical scanning period), the frame period (twice as long as the field period, and the phases equal to these periods multiplied by any integers. In the below-mentioned description, the frame signal is utilized as the video phase signal.

These signals which have been multiplexed in a time-divisional multiplexing circuit 115 are compressed with respect to the time axis in a time-axis compressing circuit 112, and the compressed signals are converted into serial data by a parallel-to-serial converting circuit 111. The resultant serial data constitutes a transmission signal on the CCU side as shown in FIG. 12, and then this transmission signal is transmitted via a cable 110 to a transmitting/receiving apparatus 123 on the camera 110 side. In this camera 110 side, the received transmission signal on the CCU 118 side is converted into parallel data in a serial-to-parallel converting circuit 107, and then this parallel data is expanded with respect to the time axis in a time-axis expanding circuit 106. Thereafter, the expanded parallel data is separated into a video signal, an audio signal, and a control signal by a separating circuit 105. At the same time, the coded frame signal is detected by a video phase detecting circuit 108, and based on the phase of this coded frame signal, the reference video phase signal of the camera 101 is produced by a reference video phase generating circuit 109. The camera 101 is operated in response to this reference video phase signal. As a result, the operation of this camera 101 is synchronized with that of the CCU 118.

The camera 101 outputs the digitalized video signal, audio signal and control signal. These digitalized signals are multiplexed in the time-divisional multiplexing circuit 102, are compressed with respect to the time axis in a time axis compressing circuit 103, and thereafter are converted into serial data by a parallel-to-serial converting circuit 104. Thus, the resultant serial data constitute the transmission signal on the camera side, as represented in FIG. 12. The transmission signal is transmitted via a cable 110 to the CCU 118 side. In a transmitting/receiving apparatus 124 provided on the CCU 118 side, the received transmission signal derived from the camera 101 side is converted into the parallel data by a serial-to-parallel converting circuit 113, is expanded with respect to the time axis by a time-axis expanding circuit 114, and then is separated into a video signal, an audio signal, and a control signal in a separating circuit 116.

Subsequently, compatibility between the video phase synchronization and the bidirectional signal transmission will now be described more in detail. First, in order that the frame signal of the CCU 118 which is as the reference for the operation timing of the overall system, is firmly transmitted, and also is correctly detected as the frame period signal on the camera 101 side, not only, as described above, the signal is converted into the specific sync code, but also a relationship with the transferring period for the bidirectional transmission operation must be considered. Here, as represented in FIG. 12, assuming now that the transferring period is T; the time axis compression ratio on the CCU 118 side is T0/T; the time axis compression ratio on the camera 101 side is T1/T; the transmission delay time caused in the cable 110 is Td (one way transmission); and the preamble period is Tp (not shown), if the transferring period T is defined by: T>T0+T1+(Td+Tp)×2, then it is possible to avoid duplication of transmission data in the bidirectional manner. This preamble period implies a preparation period required to perform the clock synchronization when such serial data that the signal period and the no signal period are repeated is converted into parallel data.

As a consequence, the bidirectional signal transmission can be realized when the transmission signal on the CCU 118 side is outputted via the cable 110 during the period T0, and thereafter the transmission signal on the camera 101 side is outputted during the period T1.

However, when this transferring period T is selected to have no relationship with the phase of the frame signal, the phase of the frame signal outputted from the CCU 118 is not always coincident with the period T0 of the transmission signal on the CCU 118 side. Thus, there are some possibilities that the frame signal is not transmitted to the camera 101 side, so that it is practically difficult to synchronize the phase of the video signal in the CCU 118 with that in the camera 101.

To solve this problem, the transferring period T of the bidirection transmission is selected in such a manner that this transferring period T is repeated at the period of the frame signal, as indicated in the following conditions (a) to (d):

(a): 1 frame=n×Tn, (b): 1 frame=n×Tn+m×Tm, (c): 1 frame=n×Tn+m×Tm +k×Tk, (d): 1 frame=Σni×Ti, where symbols Tn, Tm, Tk, Ti denote transferring periods, and symbols n, m, k, ni represent positive integer other than 0.

In this case, when these transferring periods are selected to be the values obtained by multiplying the period of the horizontal scanning period signal by any integers, the resulting circuit can be apparently made simple. When this transmission system is adapted to the NTSC system, 1 frame is equal to 525 H.

Accordingly, based on 525H=21×25H, for instance, the transferring period may be selected to be 25H so as to satisfy the above-described condition (a). Note that symbol "H" indicates the horizontal scanning period.

In the above-described relationship (b), after the n-divided digital video signals are transmitted n times at the period of Tn during one transmission period, m-divided digital video signals are transmitted m times at the period of Tm during the subsequent transmission period within 1 frame period. In the above-mentioned relationship (c), after the n-divided digital video signals are transmitted at the period of Tn during one transmission period, the m-divided digital video signals are transmitted at the period of Tm during the transmission period, and the k-divided digital video signals are transmitted at the period of Tk during the next transmission period within 1 frame period.

Under such an initial condition that the above-described conditions can be satisfied, the operations of the present invention will be further explained. The control operation of an I/O unit (namely, data fetching/outputting unit: data fetching gate 121/output gate 122 shown in FIG. 11) on the CCU 118 side is carried out in response to the frame signal of the CCU 118 side. During the period T0 shown in FIG. 12, the transmission signal which has been compressed with respect to the time axis on the CCU 118 side is sent out to the cable 110. At this time, the data fetching gate 121 is closed. Then, after the data transmission on the CCU 118 side has been accomplished, the output gate 122 is closed. At the same time, the data fetching gate 121 is opened to wait for data.

On the other hand, the transmitting/receiving apparatus 123 on the camera unit 101 is first controlled under data waiting condition. In other words, the data output gate 120 provided in the transmitting/receiving apparatus 123 is closed, and the data fetching gate 119 is under open state.

As described above, the transmitting sync code which has the phase shown in FIG. 12 has been inserted into the head of the transmission data which has been compressed with respect to the time axis on the CCU 118 side. When this transmitting sync code is detected by the video phase detecting circuit 108, the reference video phase generating circuit 109 performs the input/output controls (I/O controls) of the gates 119 and 120 on the basis of this detected phase.

Then, after this transmitting sync code has been detected, the transmission signal data on the CCU 118 side is fetched during period T0. After this data fetching operation, the fetching gate 119 is closed and thereafter the output gate 120 is open. During the time period of T1, the transmission data on the camera 101 side is sent out to the cable 110.

When the data transmissions are carried out in the above-described manner, time T2 at which the final transmission data within 1 transferring period on the camera 101 side reaches the CCU 118 side may be defined by the following equation, while the transferring period phase on the CCU 118 side is expressed as the reference;

$$T2=Td+T0+T1+Td<T.$$

Then, the bidirectional signal transmission can be realized.

As previously explained, the coded frame signal has been inserted into the head portion of the transmission data on the CCU 118 side every 1 frame at the same time when the transmitting sync code is inserted therein. In the camera 101 side, this coded frame signal is detected by the video phase detecting circuit 108, and the reference video phase signal is produced by the reference video phase generating circuit 109 on the basis of this detected phase. Then, based on this reference video phase signal produced from the reference video phase signal generating circuit 109, the vertical and horizontal scanning period signals for the camera 101 are produced. As a result, the transmission data on the camera 101 side are outputted in synchronism with the frame phase and the transferring period phase used in the CCU 118.

On the other hand, since the circuit on the CCU 118 side is under data waiting condition, when the transmitting sync code used in this camera 101 is detected on the CCU 118 side, the transmission signal data on the camera 101 side are fetched during the period of T1. Then, the fetched transmission signal data on the camera 101 side is converted into parallel data in the serial-to-parallel converting circuit 113, is expanded with respect to the time axis in the time axis expanding circuit 114, and thereafter is separated into the video, audio, and control signals in the separating circuit 116, while the frame signal used in the CCU 118 side is employed as the reference signal. As a consequence, the phase of the data on the camera 101 side can be completely synchronized with the video phase on the CCU 118 side. For instance, in FIG. 12, after the transmission data on the camera 101 side is transmitted to the CCU 118 side and expanded, this video phase becomes the phase of Tx with respect to the frame phase on the CCU 118 side, which is a fixed phase irrelevant to the cable delay amount.

In the above-explained embodiment of the present invention, the transferring periods T0 and T1 for the respective transmission signals on the CCU 118 side and the camera 101 side are fixed values under such initial condition that the data amounts in the CCU 118 and the camera 101 are constant in unit of the transmission period. However, in case that the data amount is varied in unit of the transferring period, considering the circuit scale and the like when the transmission data is optimized with respect to the transmission format, the sync codes (data ending codes) are inserted into not only the data head portion of the transmission signal, but also the last portion thereof, so that the data ending time instant may be reported to the signal reception side. In this case, the I/O units employed on the CCU 118 side and the camera 101 side may be controlled with employment of both the phase of the transmitted sync code and the phase of the data ending code.

In other words, at the data receiving side, the data fetching operation may be commenced from the phase of the transmitting sync code, and be accomplished when the phase of the data ending code is detected.

There is another method such that the phase information is coded, and this phase information is added to the end of the sync code for transmission purposes, instead of the above-described frame signal being used as the video phase signal. Assuming now that the repetition period of the signal transmission is set to 20H ("H" being horizontal scanning period), the transmission cycles are repeated 105 times per 4 frames. When the cycle number (namely, which transmission cycle within 105 cycles) is transmitted at least one time within this 105-repetition period, the video phase may be reproduced on the camera 101 side.

For example, when the information about the cycle number 10 is attached to the sync code in the 10th transmission cycle of the first frame within the four frames and the resultant sync code is transmitted from the CCU 118 side, the frame phase of the CCU 118 may be detected on the camera 101 side. As an example of the circuit arrangement capable of detecting the phase, this circuit arrangement may be constituted by a decoder for continuously monitoring the cycle number; a circuit for producing a pulse signal from the transmitting sync code; an up counter for counting up the counting content in response to this pulse signal; and a comparator for comparing the output from the counter with the cycle number. When, for instance, the cycle number value 10 is loaded on the counter at such a timing that the output from the counter is coincident with the cycle number (in this case, cycle 10), the phase synchronization can be simply established between the CCU 118 and the camera 1. Since it is simply possible to derive the frame period from this counter for the 4-frame period, explanations thereof are omitted.

In this embodiment, such wire signal transmissions as the triple coaxial cable have been explained as the transmission path. However, the present invention is not limited to such wire signal transmissions, but may be applied to the wireless video, audio and data multiplex transmission system such as FPU (Field Pick-up Unit).

Figure 13:
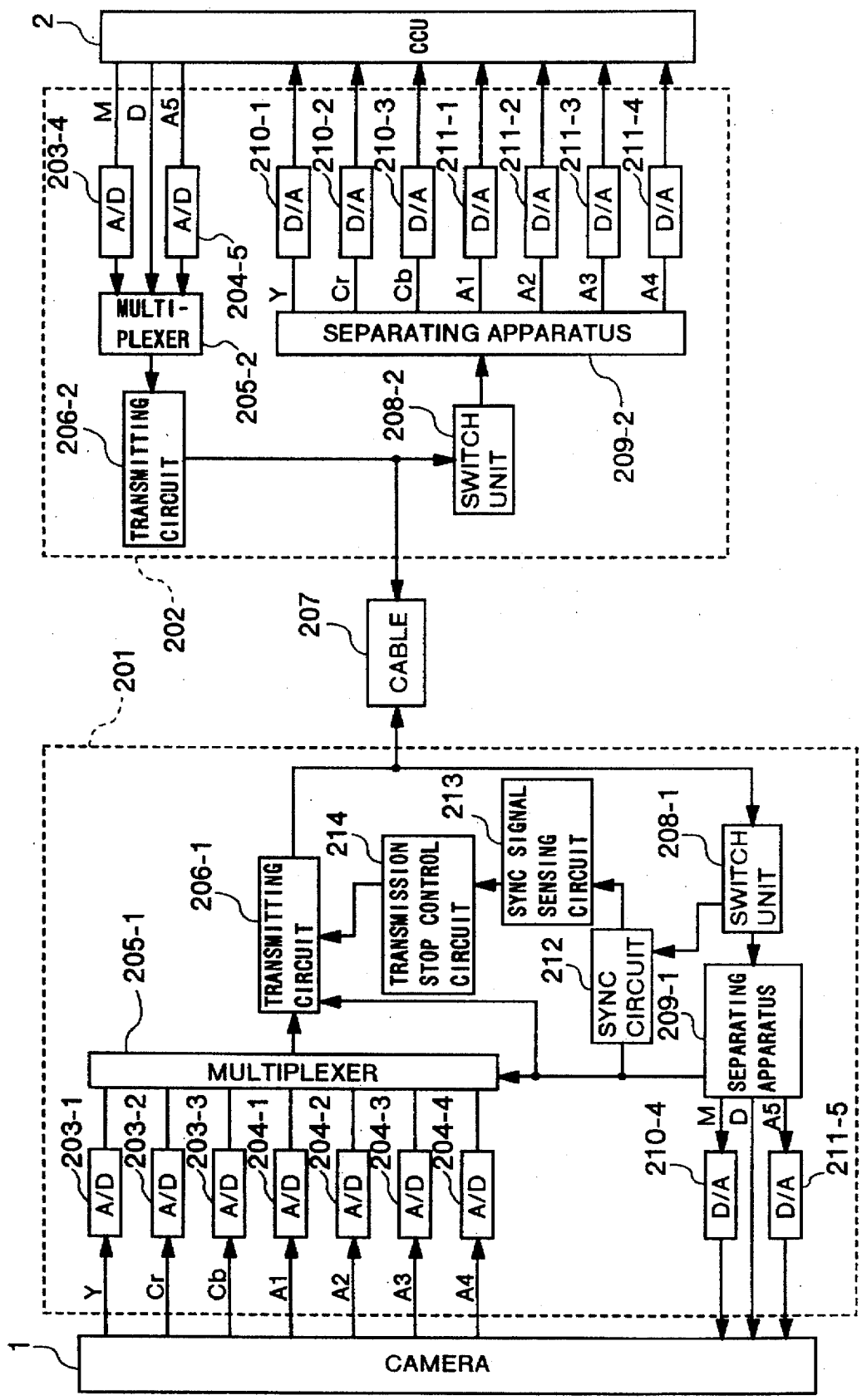
FIG. 13 is a schematic block diagram for showing a video signal bidirectional transmission system according to a further embodiment of the present invention.

FIG. 13 schematically shows an arrangement of a digital video signal bidirectional transmission system according to another embodiment of the present invention. Operations of this bidirectional transmission system will now be described.

First, at both ends of a transmission path 207, a video signal, an audio signal and the like are digitally processed, and then the digital video and audio data and other digital data are processed by way of the time-divisional multiplexing and the time axis compressing. Accordingly, a transmission signal constructed by such a repetition of a signal period and a no signal period is produced. During the no signal period of the transmission signal transmitted from one end of the transmission path, the transmission signal sent from the other end thereof is mutually transmitted. Since this signal transmission technique has been described in detail with reference to the previous embodiment of FIG. 1, this technique will be simply described as follows.

It is assumed that the video signal obtained from the camera 1 is a luminance signal Y and two sorts of color difference signals Cr, Cb. Also, the color difference signals Cr and Cb each has a frequency band (range) equal to a half of that of the luminance signal Y. The three sorts of signals are converted into digital signals by A/D converters 203-1, 203-2, 203-3 of a transmitting/receiving apparatus 201. Now, with respect to the sampling frequency (for instance, 13.5 MHz) of the A/D converter 203-1, the sampling frequencies of the remaining A/D converters 203-2 and 203-3 may be selected to be less than ½ of the first-mentioned sampling frequency, for instance, 6.75 MHz. Since the quantizing bit number may be selected to be, for example, 8 bits, i.e., all of these quantizing bit numbers are identical to each other, a summation (108 Mb/s) of the bit rates of these color difference signals Cr and Cb is equal to the bit rate of the luminance signal Y.

On the other hand, the video signal M produced in the CCU 2 is converted into a digital video signal by an A/D converter 203-4 of a transmitting/receiving apparatus 202.

The sampling frequency and the quantizing bit number of this video signal are equal to those of the luminance signal Y, and also the bit rate thereof is equal to that of the luminance signal Y. It should be understood that assuming now that the number of scanning line per 1 frame of the video signal is selected to be 525 and the frame frequency thereof is selected to be 29.97 Hz, the sampling operation with 13.5 MHz implies that the sampling number (pixel number) per 1 scanning line is selected to be 858 (=13,500,000/525/29.97).

Audio signals A1, A2, A3, A4, A5 derived from the camera 1 are converted into digital codes by A/D converters 204-1, 204-2, 204-3, 204-4, 204-5. It should be noted that the sampling frequency and the quantizing bit number of this digital code are selected to be, for example, 48 KHz and 16 bits, and the bit rate thereof is selected to be 768 Kb/s. The bit rate of the control signal D is on the order of 768 Kb/s, for simplicity.

Now, the digitalized video signals Y, Cr, Cb, and also audio signals A1, A2, A3, A4 of the camera 1 side are processed by the time divisional multiplexing and the time axis compressing in a multiplexing apparatus 205-1 of the transmitting/receiving apparatus 201, thereby producing such transmission signals constructed by a repetition of a signal period and a no signal period. Similarly, the video signal M, audio signal A5, and control signal D of the CCU 2 side are processed by the time divisional multiplexing and the time axis compressing in a multiplexing apparatus 205-2 of the transmitting/receiving apparatus 202, thereby producing transmission signals constructed by a repetition of a signal period and a no signal period. Then, these transmission signals are transmitted via transmitting circuits 206-1 and 206-2 to a cable 207. On the other hand, in the transmitting/receiving apparatus 202, the signal received from the cable 207 is transmitted via a switch unit 208-2 and then separated by a separating apparatus 209-2 into the video signals Y, Cr, Cb, and the audio signals A1, A2, A3, A4. In the transmitting/receiving apparatus 201, the signal received from the cable 207 is transmitted via a switch unit 208-1 and then separated by a separating apparatus 209-1 into the video signal M, the audio signal A5, and the control signal D.

To separate the reception signal from the transmission signal in the switch units 208-1 and 208-2, such a timing control is required that the end portion of the reception signal is not overlapped with the start portion of the transmission signal. To this end, the video synchronization is needed between the transmitting/receiving apparatuses 201 and 202. In the normal camera system, such a synchronizing method is employed that the camera 1 side causes the video signal thereof to be synchronized with the video signal of the CCU 2 side. In case of the digital transmission, this video synchronization is carried out in accordance with the below-mentioned method.

Figure 14:
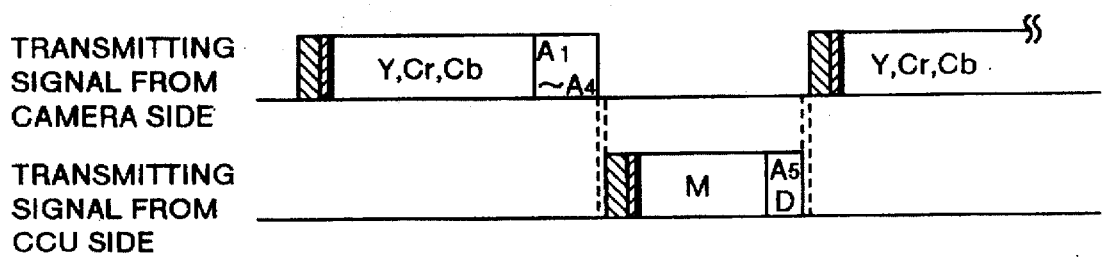
FIG. 14 is a time chart for explaining the normal synchronization condition of the transmission signal between the camera side and the CCU side.

Normally, when a digital signal is transmitted, such a method is utilized that a parallel signal having a bit length of approximately 8 bits or 10 bits is converted into a single serial signal, and then this serial signal is transmitted. As a consequence, the serially processed signal must be returned to the parallel signal at the receiving end. That is, as shown in FIG. 14, the word sync signal representative of the word end mark must be added to the head portion of the transmission signal, i.e., the signal portion just after the preamble data which is normally inserted into the head portion of the data so as to easily extract the clock signal. Also, either the horizontal sync information, or the vertical sync information as the sync information of the video signal is added to the end of the word sync signal. Based on this added sync information, a counter of a synchronizing circuit 212 employed in the camera 1 is reset, so that the video synchronization between the camera 1 and the CCU 2 can be simply established.

As described above, if the video synchronization and word synchronization can be established between the camera 1 side and the CCU 2 side, then both of the transmitting circuit 206-1 and the separating apparatus 209-1 are controlled by way of the output from the synchronizing circuit 212, as shown in FIG. 13, so that both of the transmission signal derived from the transmitting/receiving apparatus 201 and the transmission signal derived from the transmitting/receiving apparatus 202 are not present on the cable 207 at the same time, as illustrated in FIG. 14. As described above, since no two signals appear at the same time, only the signal transmitted from the transmitting/receiving apparatus 201 on the camera 1 side can be derived by the switch unit 208-2 on the transmitting/receiving apparatus side 202. Therefore, this signal can be separated into the video signal and the audio signal by the separating apparatus 209-2. Similarly, in the transmitting/receiving apparatus 201, only the signal transmitted from the transmitting/receiving apparatus 202 provided on the CCU 2 side can be derived by the switch unit 208-1, and then this signal can be separated into the video signal and the audio signal by the separating apparatus 209-1.

These separated signals are processed by way of A/D converters 210-1, 210-2, 210-3, 210-4 for video signals, and also D/A converters 211-1, 211-2, 211-3, 211-4, 211-5 for audio signals, so that these processed signals are returned to the original analog video signal and the original analog audio signal in the transmitting/receiving apparatuses 201 and 202.

As explained above, if the video synchronization could be established between the camera 1 side and the CCU 2 side, then it is simply realized that the respective transmission signals are not present on the cable 207 at the same time.

However, when such a video synchronization is no longer established due to some reasons, e.g., power start-up operation, and thus the transmission signals derived from the camera 1 and the CCU 2 appear on the cable 207 at the same time, these transmission would collide with each other, and then it is not possible to receive the sync data, so that no communication would be performed for long time. This sync data has been added to the transmission signal of the transmitting/receiving apparatus 202 so as to establish the synchronization in the other transmitting/receiving apparatus 201.

To solve the above-described problems, according to the present invention, a sync code attached to a transmission signal of a transmitting/receiving apparatus 202 on a CCU 2 side is decoded in a transmitting/receiving apparatus 201 on a camera 1 side. When such a detection can be made that this sync code is periodically received, the transmission signal of the camera 1 side is started to be transmitted. To the contrary, when this sync code cannot be received from a time period longer than a predetermined value, the transmission of the signal from the camera 1 side is stopped. These featured operations are realized by a control apparatus. Now, a detailed description will be made of this control method and operations of circuits employed in the bidirectional transmission system of this embodiment.

Figure 15A:
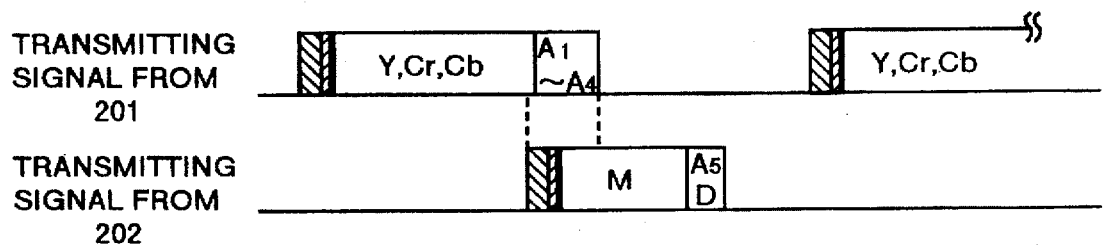
FIG. 15A and FIG. 15B are time charts for explaining the asynchronous condition of the transmission signal between the camera side and the CCU side.
Figure 15B:
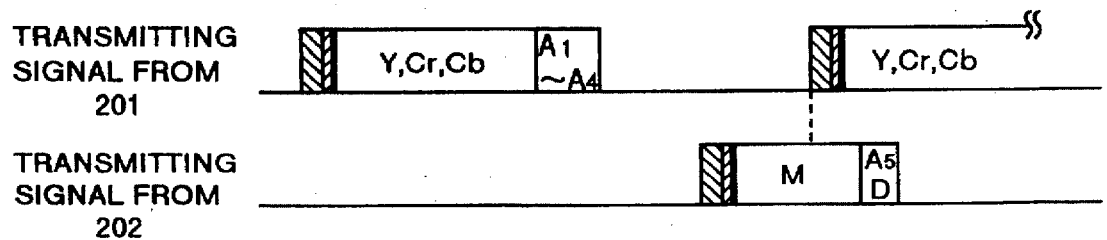

Considering now such a condition that the video synchronization cannot be established between the transmitting/receiving apparatus 201 and 202 when the power supply starts to supply the power, as illustrated in FIGS. 15A and 15B, there are possibilities that the transmission signal derived from the transmitting/receiving apparatus 201 is overlapped with the transmission signal derived from the transmitting/receiving apparatus 202. Among these cases, in such a condition that, as shown in FIG. 15A, the signal portion of the transmission signal excluding the sync code portion derived from the CCU 2 side is overlapped with the transmission signal derived from the camera 1 side, since the sync information can be obtained on the camera side 201, this condition may be captured into such a normal synchronization condition as shown in FIG. 14. However, as represented in FIG. 15B, in such a case that the sync code portions are overlapped with each other as to the transmission signals derived from the camera 1 side and the CCU 2 side, the correct sync information cannot be obtained in the transmitting/receiving apparatus 201 on the camera 1 side. Thus, a lengthy time is required to capture the operation condition into the normal sync condition.

To avoid this problem, according to the present invention, as shown in FIG. 13, there are provided a sync signal sensing circuit 213 and a transmission stop controlling circuit 214 in the transmitting/receiving apparatus 201 on the camera 1 side. The sync signal sensing circuit 213 senses that a word sync signal attached to the received transmission signal from the CCU 2 side is periodically judged. The transmission stop controlling circuit 214 for outputting such a pulse for instructing that the transmission of the transmission signal is stopped to a transmitting circuit 206-1 when the output from this sync signal sensing circuit 213 is interrupted, namely when the word sync signal is not decoded for a predetermined time period. As a consequence, when such a condition as shown in FIG. 15B is produced, the transmission of the transmission signal derived from the transmitting/receiving apparatus 201 on the camera 1 side is stopped for a preselected time period (a time period longer than such a time duration that after the camera has fetched the correct information, the operation condition is captured into the sync condition, for instance, two vertical scanning periods). As a result, it is possible to fetch the video sync information in the transmitting/receiving apparatus 201 on the camera 1 side, and thus the operation can be captured into the normal synchronization condition.

Figure 16:
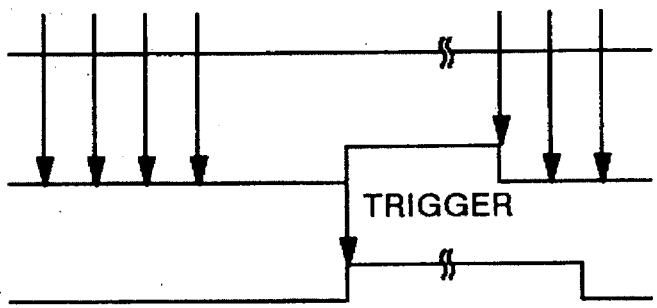
FIG. 16 is a diagram for explaining operations to recover the transmission signal to the synchronization condition.
Figure 17:
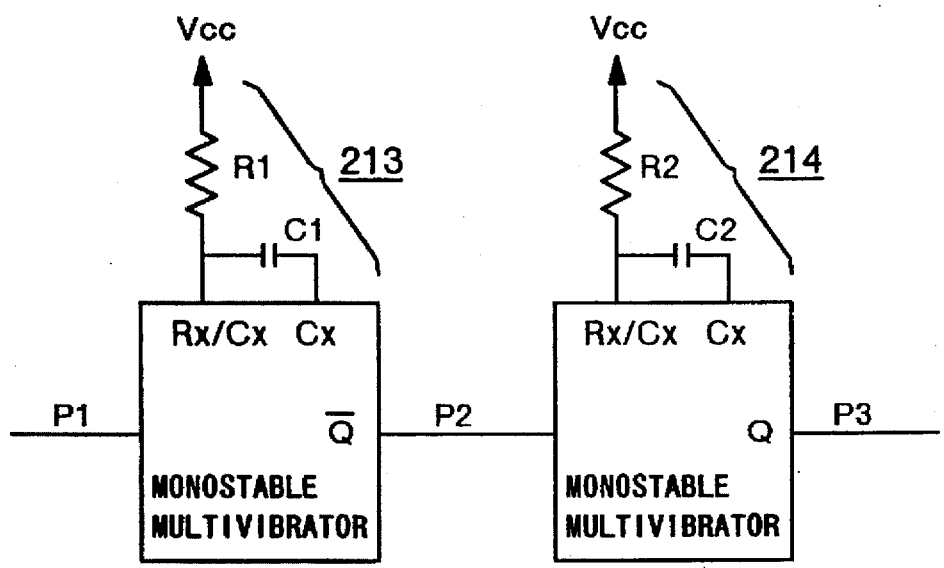
FIG. 17 schematically indicates a concrete arrangement of the sync signal detecting circuit and the transmission stop controlling circuit employed in the transmission system of the present invention.

The sync signal sensing circuit 213 for sensing that the word sync signal is periodically decoded may be simply arranged by a first monostable multivibrator, as shown in FIG. 17. This first monostable multivibrator is of triggerable type into which a sync signal sensing pulse P1 is inputted as a trigger input. When an output P2 is entered into a second monostable multivibrator for constituting the transmission stop control circuit 214 for outputting such a pulse used to instruct to stop the transmitting operation of the transmission signal, another pulse P3 for instructing the interruption of sending the transmission signal from the transmitting/receiving apparatus 201 on the camera 1 side may be simply obtained, as represented in a time chart of FIG. 16.

It should be understood that the periodical characteristic of the video sync data may be checked, instead of checking the periodical characteristic of the word sync signal. That is, also the video sync data is received at the horizontal scanning period, the vertical scanning period, or the period obtained by multiplying these scanning periods by any integers. As a result, this periodical characteristic is judged in the completely same manner to the word sync signal. When this periodical characteristic is interrupted, the transmission stop instruction is given to the transmitting circuit 206-1. Consequently, the video sync information can be acquired in the transmitting/receiving apparatus 201 on the camera 1 side, and the operation condition can be captured into the normal sync condition, whereby the transmission signals can be transmitted under normal bidirectional manner in a similar manner to the previous embodiment.

In this embodiment, such a wiring signal transmission with the coaxial cable has been described as the transmission path. However, the present invention is not limited thereto, but may be applied to such wireless type multiplexing transmission system for the video, audio, and data signals, for instance, FPU (Field Pick-up Unit).

Figure 18:
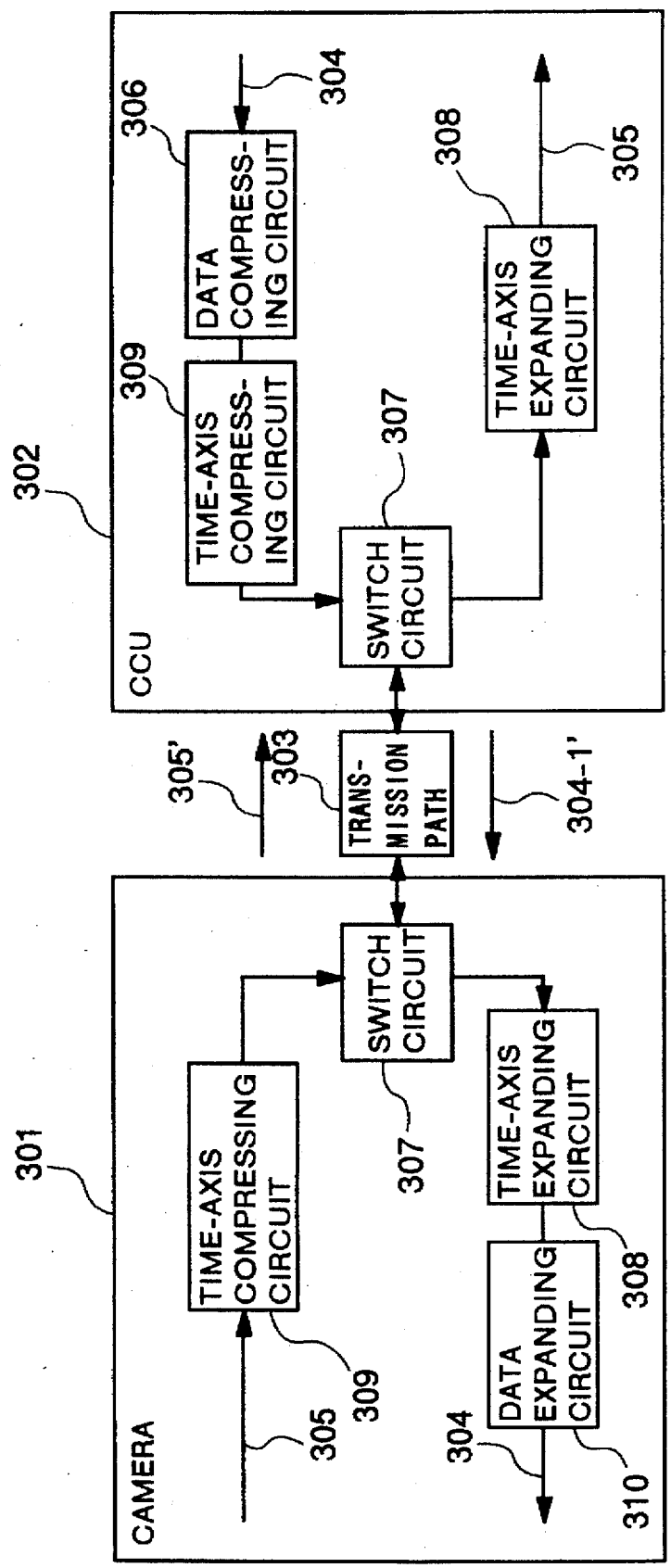
FIG. 18 is a schematic block diagram for indicating a video signal bidirectional transmission system according to a still further embodiment of the present invention.
Figure 19:
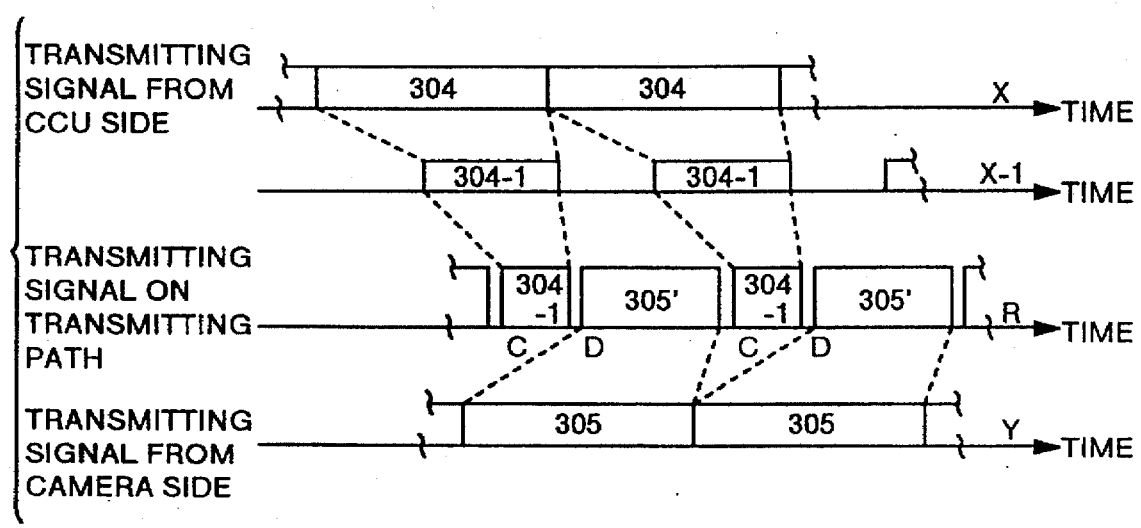
FIG. 19 is a time chart for explaining operations of the data compression performed in the transmission system of FIG. 18.

A description will now be made of an arrangement of a bidirectional signal transmission system effected between a camera and a CCU (camera control unit), according to another embodiment of the present invention, with reference to FIG. 18 and FIG. 19. In these drawings, reference numeral 301 indicates a camera which includes the transmitting/receiving apparatus, rereference numeral 302 denotes a CCU (camera control unit) which includes the transmitting/receiving apparatus, reference numeral 303 represents a transmission path (cable), reference numeral 304 shows such a transmission signal as a video signal, an audio signal, and a control signal, which should be transmitted from the CCU 302 to the camera 301. Reference numeral 305 is a transmission signal such as a video signal, an audio signal and a control signal from camera 301 to CCU 302. Reference numeral 306 is a data compressing circuit for performing a band limitation and a data compression of the transmission signal 304. Reference numeral 307 shows a switch circuit for switching transmission/reception of the transmission signal (will be discussed later). Reference numeral 308 shows a time axis expanding circuit for performing a time axis expansion of the transmission signal (will be described later). Reference numeral 309 indicates a time axis compression circuit for performing a time axis compression and a time-division multiplexing of the transmission signals 304 and 305. Reference numeral 310 is a data expansion circuit for expanding the transmission data (will be explained later).

Reference numeral 304-1' represents such a transmission signal obtained by that the transmission signal 304 of the CCU 302 is processed by the band limitation, data compression, and time axis compression, and also time-divisional multiplexing. Reference numeral 305' shows a transmission signal transmitted from the camera 301 to the CCU 302, which is processed in the time axis compression and the time-divisional multiplexing in the camera 301.

Assuming now that the transmission bit rate of the transmission path 303 is set to 340 Mb/s, and the bit rates X and Y of the transmission signals 304 and 305 are set to 270 Mb/x respectively, the transmission signal 304 of the CCU 302 is either band-limited or data-compressed to produce such a signal 304 whose bit rate has been compressed into the bit rate x−1 (for example, 54 Mb/s) so as to transmit the transmission signal 305 from the camera 301 without any deterioration, namely without lowering the data amount thereof. As a consequence, a summation of the transmission bit rates of the transmission signals 304 and 305 can satisfy the transmission bit rate condition about the above-described bi-directional transmission path as follows:

R(=340 Mb/s)>X−1+Y(=54 Mb/s+270 Mb/s=324 Mb/s).

Subsequently, operations of this bidirectional signal transmission system will now be explained. The transmission signal 304 of the CCU 302 having the bit rate "X" (270 Mb/s) is supplied to the data compression circuit 306, so that this signal is processed by the band limit and the data compression to produce such a compressed signal 304-1 having the data amount of the bit rate X−1 (54 Mb/s). As this data compression method, there are proposed such a simple DPCM (Differential Pulse Code Modulation) system, and other orthogonal conversion methods of JPEG (Joint Photographic Coding Expert Group) and MPEG (Motion Picture Coding Expert Group). These data compression methods may be employed in the bidirectional signal transmission system according to the present invention.

The signal which has been data-compressed at this bit rate X-1 (54 Mb/s) is compressed with respect to the time axis by the time axis compressing circuit 309 to obtain a transmission signal 304'-1. This transmission signal 304-1' is transmitted via the transmission path 303 of the transfer bit rate R (340 Mb/s) to the camera 301 at a timing "C" corresponding to the no signal period of the transmission signal 305' derived from the camera 301 by the switch circuit 307.

The transmission signal 304-1' transmitted via the transmission path 303 is supplied to the time axis expanding circuit 308 by the switch circuit 307 of the camera 301 so as to carry out the expanding process for the time axis compressing process effected by the time axis compressing circuit 308 of the CCU 302. Further, the data compressed by the data compression circuit 306 of the CCU 302 is expanded by the data expanding circuit 310, so that this transmission signal is returned to the original image data to be outputted as a signal 304.

On the other hand, the transmission signal 305 having the bit rate Y (270 Mb/s) of the camera 301 is supplied to the time axis compressing circuit 309 in which only the time axis compression is carried out, so that the time-axis compressed signal is transmitted by the switch circuit 307 at a timing "D" corresponding to the no signal period of the transmission signal 304-1' derived from the CCU 302 via the transmission path 303 having the transmission bit rate R (340 Mb/s) as a transmission signal 305' without any image loss.

The transmission signal 305' transmitted through the transmission path 303 is furnished to the time axis expanding circuit 308 by the switch circuit 307. In this time axis expanding circuit 308, the time axis compression effected by the time axis compressing circuit 309 of the camera 301 is expanded, so that this transmission signal is returned to the original image data without any deterioration in image qualities (because of no data compression), which will then be outputted as a signal output 305.

As previously described, such a video signal whose image quality is not allowed to be deteriorated due to use in the broadcasting as the transmission signal 305' transmitted from the camera 301 to the CCU 302, is transmitted by performing only the time axis compressing process without any deterioration. To the contrary, such a return video signal whose image quality is allowed to be slightly deteriorated, and which is used so as to monitor the image in the on-line mode by a cameraman, as the signal 304-1' transmitted from the CCU 302 to the camera 301, is processed by way of the band limitation and the data compression. Then, the bit rate of the processed signal is lowered and the resultant signal is transmitted.

As a consequence, since the overall transmission bit rate may be lowered, it is possible to realize such a transmission apparatus capable of performing the bidirectional signal transmission at the highest efficiency by employing the transmission path with the limited transmission bit rate, and also the frequency bandwidth required in the signal transmission may be narrowed.

For instance, when the transmission signals 304 and 305 having the bit rates of 270 Mb/s respectively are bidirectionally transmitted without overlapping the data with each other, normally it is required such a transmission path with the transmission bit rate higher than 540 Mb/s. In accordance with the present embodiment, such a bidirectional signal transmission can be realized by the transmission path with the transmission bit rate of 340 Mb/s.

In this embodiment, the bidirectional signal transmission between the camera and the CCU is employed, and such signal processes as the band limitation and the data compression are performed only for the transmission signal transmitted from the CCU to the camera. However, the present invention is not limited thereto, but may be applied to the transmission signal which is transmitted from the camera to the CCU, for which the band limitation/data compression process operations are carried out. Furthermore, the overall transmission bit rate may be lowered.

It should also be noted that the present invention is not limited to the bidirectional signal transmission between the camera and the CCU, but also applied to such bidirectional signal transmissions between FPUs, and transmitting apparatuses in a cable television system.

In this modification case, the band limitation process and the data compression process may be performed in the respective transmitting apparatuses, depending on the transmission bit rates of these transmission signals and transmission patches. Moreover, the overall transmission bit rate may be reduced.

In accordance with the present invention, the digitally processed video signal, audio signal, and control signal are time-divisionally multiplexed, and both the signal period and the no signal period are provided by way of the time compressing process with respect to the signal transmission between the two video appliances. As a consequence, the simultaneous digital signal transmission can be achieved from both ends of the cable without overlapping the signal periods with each other. There is such an advantage that the high-performance signal bidirectional transmission can be realized without any noises and distortions.

Also, since the bidirectional signal transmission system is so arranged that all of the operation timings are synchronized with the reference signal of one transmission apparatus among the mutual transmission apparatuses, operations of the plural apparatuses can be synchronized with each other.

In addition, since such a time unit is employed which is obtained by subdividing the frame period into a plurality of time blocks as the transferring period in the bidirectional signal transmission, there are many advantages as follows:

(1). The frame signal as the video phase information can be readily transmitted, so that the frame phase can be easily detected on the camera side.

(2). Since the frame period is two times longer than the vertical scanning period, the process for removing the vertical flyback period so as to compress the transmission data amount can be simply performed, and thus the circuit can be reduced.

Also, according to the present invention, even when the video synchronization cannot be established due to the power start-up condition and the occurrence of communication failure, overlapping of the transmission signals can be solved within short time, so that the high performance image transmission can be stably realized without any noise and distortion.

In accordance with the present invention, when the signal is bidirectionally transmitted via the transmission path having a predetermined transmission bit rate, such a signal which should be transmitted without any deterioration is processed by way of only the time-axis compression process, whereas such a signal which may be transmitted with allowable deterioration levels is processed by way of the band limitation process and the data compression process, and thus the bit rate thereof is lowered. As a consequence, the overall transmission bit rate can be lowered without deteriorating the quality of the most required signal. Furthermore, since the frequency band required for the data transmission can be narrowed, the hardware amount of the bidirectional signal transmission system can be reduced and there is no limitation in the transmission distance. Therefore, such a bidirectional signal transmission system can be readily realized.

What is claimed is:

1. A video signal transmission method wherein digital signals including at least digital video signals are bidirectionally transmitted and received in substantially real time between first and second video appliances coupled via a transmission path, said first and second video appliances each including a transmitting and receiving apparatus, said method comprising the steps of:

dividing a first digital signal of said first video appliance into a plurality of predetermined periods, and time-axis compressing said first divided signal to produce a first divided and compressed digital signal repeating a signal period and a no signal period alternately, said first divided and compressed signal being transmitted on said transmission path;

controlling said transmitting and receiving apparatus of said first video appliance to generate a first transmission period and a second transmission period alternately on said transmission path, said first transmission period being longer than said second transmission period, so that said first divided and compressed digital signal of said first video appliance is transmitted to said second video appliance in said first transmission period of said transmission path;

receiving said first divided and compressed digital signal from said first video appliance at said second video appliance; and time-axis expanding said first divided and compressed digital signal to reproduce said first digital signal at said second video appliance;

wherein the period of said first divided and compressed digital signal is synchronized with that of said first transmission period; and wherein when each of said predetermined periods into which said first digital signal is divided is Tf, said first transmission period is a period defined by one of the following equations:

(a) $Tf = n \times Tn$, (b) $Tf = n \times Tn + m \times Tm$, (c) $Tf = n \times Tn + m \times Tm + k \times Tk$, and (d) $Tf = \Sigma(ni \times Ti)$, where symbols Tn, Tm, Tk, Ti denote said first transmission period, and symbols n, m, k, ni, i represent positive integers other than 0.

2. A video signal transmission method as claimed in claim 1, wherein said predetermined period Tf is set to a period of one frame period of said video signal multiplied by any positive integer other than 0.

3. A video signal transmission method as claimed in claim 1, wherein said predetermined period Tf is set to a period of one field period of said video signal multiplied by any positive integer other than 0.

4. A video signal transmission method as claimed in claim 1, wherein said predetermined period Tf is set to a period of one scanning line of said video signal multiplied by any positive integer other than 0.

5. A video signal transmission method wherein digital signals including at least digital video signals are bidirectionally transmitted and received in substantially real time between first and second video appliances coupled via a transmission path, said first and second video appliances each including a transmitting and receiving apparatus, said method comprising the steps of:

dividing a first digital signal of said first video appliance into a plurality of predetermined periods, and time-axis compressing said first divided signal to produce a first divided and compressed digital signal repeating a signal period and a no signal period alternately, said first divided and compressed signal being transmitted on said transmission path;

controlling said transmitting and receiving apparatus of said first video appliance to generate a first transmission period and a second transmission period alternately on said transmission path, said first transmission period being longer than said second transmission period, so that said first divided and compressed digital signal of said first video appliance is transmitted to said second video appliance in said first transmission period of said transmission path;

receiving said first divided and compressed digital signal from said first video appliance at said second video appliance; and time-axis expanding said first divided and compressed digital signal to reproduce said first digital signal at said second video appliance;

wherein in at least one of said first and second video appliances, said method further comprises the step of adding a synchronization signal to said transmitted divided and compressed digital signal at a predetermined position in said transmitted divided and compressed digital signal in each transmission period; and wherein in at least one of said first and second video appliances, said method further comprises the steps of:
detecting said synchronization signal from said received divided and compressed digital signal; and
stopping transmission of said divided and compressed digital signal for a predetermined time in a case of no detection of said synchronization signal in a predetermined detection repetition pattern within at least a predetermined time.

6. A video signal transmission method wherein digital signals including at least digital video signals are bidirectionally transmitted and received in substantially real time between first and second video appliances coupled via a transmission path, said first and second video appliances each including a transmitting and receiving apparatus, said method comprising the steps of:

dividing a first digital signal of said first video appliance into a plurality of predetermined periods, and time-axis compressing said first divided signal to produce a first divided and compressed digital signal repeating a signal period and a no signal period alternately, said first divided and compressed signal being transmitted on said transmission path;

controlling said transmitting and receiving apparatus of said first video appliance to generate a first transmission period and a second transmission period alternately on said transmission path, said first transmission period being longer than said second transmission period, so that said first divided and compressed digital signal of said first video appliance is transmitted to said second video appliance in said first transmission period of said transmission path;

receiving said first divided and compressed digital signal from said first video appliance at said second video appliance; and time-axis expanding said first divided and compressed digital signal to reproduce said first digital signal at said second video appliance;

wherein at each of said first and second video appliances, said method further comprises the step of transmitting a signal having a level substantially equal to an average value of said digital signals of said transmission period when no signal is transmitted in said transmission period.

7. A video signal transmission method as claimed in claim 6, further comprising the step of discriminating a high level and a low level based on a predetermined reference value from said received divided and compressed digital signal;

wherein said reference value is set to a value which is lower than an average value of said digital signals by a value corresponding to an attenuation amount of said digital signal in said transmission path.

8. A video signal transmission system wherein digital signals containing at least digital video signals and digital audio signals are bidirectionally transmitted and received in substantially real time in first and second video appliances coupled via a transmission path, said first and second video appliances each including a transmitting and receiving apparatus, said first video appliance comprising:

means for producing a first digital signal by time-division multiplexing at least said digital video signal and said digital audio signal;

means for dividing said first digital signal into a plurality of predetermined periods and time-axis compressing said first divided digital signal in order to produce a first divided and compressed digital signal repeating a signal period and a no signal period alternately;

means for transmitting said first divided and compressed digital signal to said second video appliance through said transmission path;

means for controlling said transmitting and receiving apparatus of said first video appliance to generate a first transmission period and a second transmission period alternately on said transmission path, said first transmission period being longer than said second transmission period, and controlling said transmitting means so that said first divided and compressed digital signal of said first video appliance is transmitted to said second video appliance in said first transmission period of said transmission path;

means for receiving a second divided and compressed digital signal from said second video appliance;

means for time-axis expanding said second divided and compressed digital signal to reproduce a second digital signal; and means for separating said time-axis expanded second digital signal to reproduce at least a digital video signal and a digital audio signal;

wherein said second video appliance comprises:

means for producing a second digital signal by multiplexing at least said digital video signal and said digital audio signal;

means for dividing said second digital signal into a plurality of predetermined periods and time-axis compressing said second divided digital signal in order to produce said second divided and compressed digital signal repeating a signal period and a no signal period, alternately;

means for transmitting said second divided and compressed digital signal to said transmission path;

means for controlling said transmitting and receiving apparatus and said transmitting means to transmit said second divided and compressed digital signal in said second transmission period to said first video appliance through said transmission path;

means for receiving said first divided and compressed digital signal from said first video appliance;

means for time-axis expanding said first divided and compressed digital signal to reproduce a first digital signal; and means for separating said time-axis expanded digital signal to reproduce said digital video signal and said digital audio signal;

wherein said first video appliance further comprises means for adding a synchronization signal to said transmitted first divided and compressed digital signal at a predetermined position in said transmitted divided and compressed digital signal in each transmission period; and wherein said second video appliance further comprises:

means for detecting said synchronization signal from said received first divided and compressed digital signal; and means for stopping transmission of said second divided and compressed signal when said synchronization signal is not detected within a predetermined time.

9. A video signal transmission method wherein digital signals including at least digital video signals are bidirectionally transmitted and received in substantially real time between first and second video appliances coupled via a transmission path, said first and second video appliances each including a transmitting and receiving apparatus, said method comprising the steps of:

dividing a first digital signal of said first video appliance into a plurality of predetermined periods, and time-axis compressing said first divided signal to produce a first divided and compressed digital signal repeating a signal period and a no signal period alternately, said first divided and compressed signal being transmitted on said transmission path;

controlling said transmitting and receiving apparatus of said first video appliance to generate a first transmission period and a second transmission period alternately on said transmission path, said first transmission period being longer than said second transmission period, so that said first divided and compressed digital signal of said first video appliance is transmitted to said second video appliance in said first transmission period of said transmission path;

receiving said first divided and compressed digital signal from said first video appliance at said second video appliance;

time-axis expanding said first divided and compressed digital signal to reproduce said first digital signal at said second video appliance;

dividing a second digital signal of said second video appliance into a plurality of predetermined periods, and time-axis compressing said second divided digital signal to produce a second divided and compressed digital signal repeating a signal period and a no signal period alternately;

controlling said transmitting and receiving apparatus of said second video appliance so that said second divided and compressed digital signal of said second video appliance is transmitted to said first video appliance in said second transmission period of said transmission path;

receiving said second divided and compressed digital signal from said second video appliance at said first video appliance; and time-axis expanding said second divided and compressed digital signal to reproduce said second digital signal at the first video appliance;

wherein said first divided and compressed digital signal of said first video appliance is a signal in which a video signal for one picture image from said first video appliance is divided into a plurality of said predetermined periods; and wherein said method further comprises the step of adding a first signal representing predetermined phase information relating to said video signal from said first video appliance to said first divided and compressed digital signal at a predetermined position in said first divided and compressed digital signal.

10. A video signal transmission method as claimed in claim 9, wherein said second divided and compressed digital signal of said second video appliance is a signal in which a video signal for one picture image from said second appliance is divided into a plurality of said predetermined periods; and wherein said method further comprises the step of adding a second signal representing predetermined phase information relating to said video signal from said second appliance to said second divided and compressed digital signal at a predetermined position in said second divided and compressed digital signal.

11. A video signal transmission method as claimed in claim 9, wherein said method further comprises the steps of:

detecting said first signal representing said predetermined phase information at said second video appliance; and making synchronization of a predetermined phase of said second divided and compressed digital signal as a reference of signal processing of said second video appliance on the basis of said detected first signal representing said predetermined phase information, appliance is made shorter than said first transmission period; and wherein a time duration of said second divided and compressed digital signal of said second video appliance is made shorter than said second transmission period.

12. A video signal transmission method as claimed in claim 9, wherein said first signal representing said predetermined phase information is selected from phases of a vertical scanning period of a video signal, a field period of a video signal, a frame period of a video signal, and phases equal to these periods multiplied by any integer.

13. A video signal transmission method wherein digital signals including at least digital video signals are bidirectionally transmitted and received in substantially real time between first and second video appliances coupled via a transmission path, said first and second video appliances each including a transmitting and receiving apparatus, said method comprising the steps of:

dividing a first digital signal of said first video appliance into a plurality of predetermined periods, and time-axis compressing said first divided signal to produce a first divided and compressed digital signal repeating a signal period and a no signal period alternately, said first divided and compressed signal being transmitted on said transmission path;

controlling said transmitting and receiving apparatus of said first video appliance to generate a first transmission period and a second transmission period alternately on said transmission path, said first transmission period being longer than said second transmission period, so that said first divided and compressed digital signal of said first video appliance is transmitted to said second video appliance in said first transmission period of said transmission path;

receiving said first divided and compressed digital signal from said first video appliance at said second video appliance; and time-axis expanding said first divided and compressed digital signal to reproduce said first digital signal at said second video appliance;

wherein a ratio of said first transmission period to said second transmission period is selected to be 2:1; and wherein said first transmission period and said second transmission period correspond to twelve scanning line periods and six scanning line periods, respectively, of a video signal.

14. A video signal transmission system wherein digital signals containing at least digital video signals and digital audio signals are bidirectionally transmitted and received in substantially real time in first and second video appliances coupled via a transmission path to each other, said first video appliance comprising:

means for producing a first digital signal by multiplexing of at least said digital video signal and said digital audio signal;

means for dividing said first digital signal into plurality of predetermined periods and time-axis compressing said first divided signal in order to produce a first transmission signal repeating a signal period and a no signal period, alternately;

means for transmitting said first transmission signal to said transmission path; and means for controlling said first and second video appliances to generate a first transmission period and a second transmission period alternately in said transmission path, and controlling said transmitting means so that said first transmission signal is synchronized with said first transmission period and is transmitted to said second video appliance in said first transmission period;

said second video appliance comprising:

means for producing a second digital signal by multiplexing of at least said digital video signal and said digital audio signal;

means for dividing said second digital signal into a plurality of predetermined periods and time-axis compressing said second divided signal in order to produce a second transmission signal repeating a signal period and a no signal period alternately;

means for transmitting said second transmission signal to said transmission path; and means for controlling said transmitting means so that said second transmission signal is synchronized with said second transmission period and is transmitted to said first video appliance in said second transmission period;

said first video appliance further comprising:
  means for receiving said second transmission signal from said second video appliance;
  means for time-axis expanding said second transmission signal to reproduce said second digital signal; and
  means for time-division separating said time-axis expanded digital signal to reproduce at least the digital video signal and the digital audio signal; and
said second video appliance further comprising:
  means for receiving said first transmission signal from said first video appliance;
  means for time-axis expanding said received first transmission signal to reproduce said first digital signal; and
  means for time-division separating said time-axis expanded digital signal to reproduce at least the digital video signal and the digital audio signal;
  wherein said first video appliance is a television camera, and said second video appliance is a television camera controlling apparatus.

* * * * *